(12) United States Patent
Luu

(10) Patent No.: US 8,405,628 B2
(45) Date of Patent: Mar. 26, 2013

(54) METHOD OF INTERFACING WITH MULTI-POINT DISPLAY DEVICE

(75) Inventor: David Ngan Luu, Balgownie (AU)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 12/974,267

(22) Filed: Dec. 21, 2010

(65) Prior Publication Data

US 2011/0148791 A1    Jun. 23, 2011

(30) Foreign Application Priority Data

Dec. 23, 2009    (AU) ................................ 2009251135

(51) Int. Cl.
*G06F 3/041* (2006.01)
(52) U.S. Cl. ........................................ 345/173; 715/766
(58) Field of Classification Search .......... 345/156–174, 345/422, 629, 638; 715/766–799, 863
See application file for complete search history.

(56) References Cited

U.S. PATENT DOCUMENTS

| | | | |
|---|---|---|---|
| 6,606,105 B1 | 8/2003 | Quartetti | 715/853 |
| 7,423,655 B1 | 9/2008 | Stephens | 345/624 |
| 7,543,242 B2 | 6/2009 | Goossen et al. | 715/797 |
| 8,219,937 B2 * | 7/2012 | Coddington | 715/863 |
| 2002/0036618 A1 | 3/2002 | Wakai et al. | 345/157 |
| 2008/0180405 A1 | 7/2008 | Han et al. | 345/173 |
| 2008/0211785 A1 | 9/2008 | Hotelling et al. | 345/173 |
| 2009/0237367 A1 * | 9/2009 | Ryu et al. | 345/173 |
| 2010/0141605 A1 * | 6/2010 | Kang et al. | 345/174 |

FOREIGN PATENT DOCUMENTS

| WO | WO 2007/121557 | 11/2007 |
|---|---|---|
| WO | WO 2009/061952 A1 | 5/2009 |

* cited by examiner

*Primary Examiner* — Amare Mengistu
*Assistant Examiner* — Hong Zhou
(74) *Attorney, Agent, or Firm* — Fitzpatrick, Cella, Harper & Scinto

(57) ABSTRACT

Methods (1000), apparatuses (100), and computer readable storage mediums for interfacing with a multi-point input display device (181, 204, 304) are disclosed. A visual object is displayed (1010) on a multi-point input display device (181, 204, 304). The position of a first input contacting the multi-point input display device (181, 204, 304) is detected (1020). At least the displayed visual object is selected (1030) based on the position of the first input. The position of a second input contacting the multi-point input display device (181, 204, 304) is detected (1040) contemporaneously with the first input. A separation line across the visual object is determined (1050) so as to define a first portion and a second portion of the visual object. A change in the position of the second input is identified (1060). A change in a display characteristic of the first portion relative to the second portion is controlled (1070) in accordance with the identified change in the position of the second input.

21 Claims, 18 Drawing Sheets

METHOD OF INTERFACING WITH MULTI-POINT DISPLAY DEVICE

REFERENCE TO RELATED PATENT APPLICATION

This application claims the benefit under 35 U.S.C. §119 of the filing date of Australian Patent Application No. 2009251135, filed 23 Dec. 2009 in the name of Canon Kabushiki Kaisha, hereby incorporated by reference in its entirety as if fully set forth herein.

TECHNICAL FIELD

The present invention relates generally to human input devices and in particular to multi-point input devices.

BACKGROUND

Since the widespread adoption of personal cameras, people have stored and kept photographs, for example as mementos of personal memories. Once developed, the photographs are often organised in visually appealing ways, including putting the photographs into photo frames and displaying the photo frames in a home or an office. Additionally, a collection of photographs may be organised in a photo album, with the photographs presented in the format of a book. Furthermore, creating a collage of photos on a wall or in a book is also popular. When creating a collage of photos, photos are typically layered one on top of another to provide a visually appealing effect.

With the advent of digital cameras, storing digital photographs on a computer, rather than printing out the photographs, is increasingly popular. However, organising digital photos in visually appealing ways remains popular. Digital photo frames are a well known and popular digital equivalent to the standard photo frame. Such digital photo frames allow digital photos to be stored and displayed in the manner a standard photo frame and can be placed anywhere in a house.

Digital photo album applications are also available to store and organise digital photographs in ways that allow the digital photographs to be easily browsed and searched.

Photo collages have not, however, had the same simple transition to the digital realm due to the unintuitive nature of creating a photo collage on current computing devices. To layer one photo on top of another, current methods typically involve selecting a desired image and then choosing options to either move the image above or below another image. This method is slow, especially if the ordering of many images needs to be changed, and can often result in incorrectly changing the order of images.

SUMMARY

In accordance with an aspect of the invention, there is provided a method of interfacing with a multi-point input display device. A visual object is displayed on a multi-point input display device. The position of a first input contacting the multi-point input display device is detected. At least the displayed visual object is selected based on the position of the first input. The position of a second input contacting the multi-point input display device is detected contemporaneously with the first input. A separation line across the visual object is determined so as to define a first portion and a second portion of the visual object. A change in the position of the second input is identified. A change in a display characteristic of the first portion relative to the second portion is controlled in accordance with the identified change in the position of the second input.

The second input may contact the multi-point display device in a region of an edge of the displayed visual object The separation line may be substantially perpendicular to an axis extending through at least the first input.

The display characteristic may define an ordering of two or more visual objects displayed on the multi-point input display device in an axis perpendicular to a plane of the display of the multi-point input display device. The axis may be z-order.

A gesture may be performed by two or more inputs to the multi-point input display device.

Any of a user's fingers may be used to contact the multi-point input display device. A user may contact the multi-point input display device to provide the inputs using one or more hands.

The visual object may be a digital image, a digital photograph, a bitmap, a photo album, or a page in a book.

The second input contacting the multi-point input display device may be within a region of the displayed visual object.

The method may further comprise the step of detecting the position of at least a third input contacting the multi-point input display device contemporaneously with the first input.

The second and third points contacting the multi-point input display device may be translated.

A further visual object may be displayed being at least partly overlaid by the object.

The method may further comprise the step of performing an animated peel back of a portion of the displayed visual object dependent upon the second input being translated.

An underlying object may be at least partly displayed by the animated peel back.

A portion of the underside of the displayed visual object may be displayed by the animated peel back. The display characteristic may be represented as a fold in the visual object, the first portion being flat and the second portion being folded.

In accordance with another aspect of the invention, there is provided an apparatus for interfacing with a multi-point input display device. The apparatus comprises: a memory for storing data and a computer program; and a processor unit coupled to the memory for executing a computer program, the memory and the processor configured to interface with the multi-point input display device. The computer program comprises: a computer program code module for displaying a visual object on a multi-point input display device; a computer program code module for detecting the position of a first input contacting the multi-point input display device; a computer program code module for selecting at least the displayed visual object based on the position of the first input; a computer program code module for detecting the position of a second input contacting the multi-point input display device contemporaneously with the first input; a computer program code module for determining a separation line across the visual object so as to define a first portion and a second portion of the visual object; a computer program code module for identifying a change in the position of the second input; and a computer program code module for controlling a change in a display characteristic of the first portion relative to the second portion in accordance with the identified change in the position of the second input.

In accordance with still another aspect of the invention, there is provided a computer readable storage medium having recorded therein a computer program for interfacing with a multi-point input display device. The computer program comprises: a computer program code module for displaying a visual object on a multi-point input display device; a computer program code module for detecting the position of a first input contacting the multi-point input display device; a computer program code module for selecting at least the displayed visual object based on the position of the first input; a computer program code module for detecting the position of a second input contacting the multi-point input display device contemporaneously with the first input; a computer program code module for determining a separation line across the visual object so as to define a first portion and a second portion of the visual object; a computer program code module for identifying a change in the position of the second input; and a computer program code module for controlling a change in a display characteristic of the first portion relative to the second portion in accordance with the identified change in the position of the second input.

In accordance with a further aspect of the invention, there is provided a method of interfacing with a multi-point input display device to change the z-order of a plurality of visual objects displayed on the display device. The position of a first input contacting the multi-point input display device is detected. At least one displayed visual object is selected based on the position of the first input. The position of a second input contacting the multi-point input display device is detected. A separation line is determined based on the position of the second input. The separation line separates the selected visual object into a first portion and second portion. The z-order of the selected visual object is controlled relative to another object which is moved towards the selected visual object based on the separation line.

BRIEF DESCRIPTION OF THE DRAWINGS

Embodiments of the invention are described hereinafter with reference to the following drawings, in which.

DETAILED DESCRIPTION

Figure 1A:
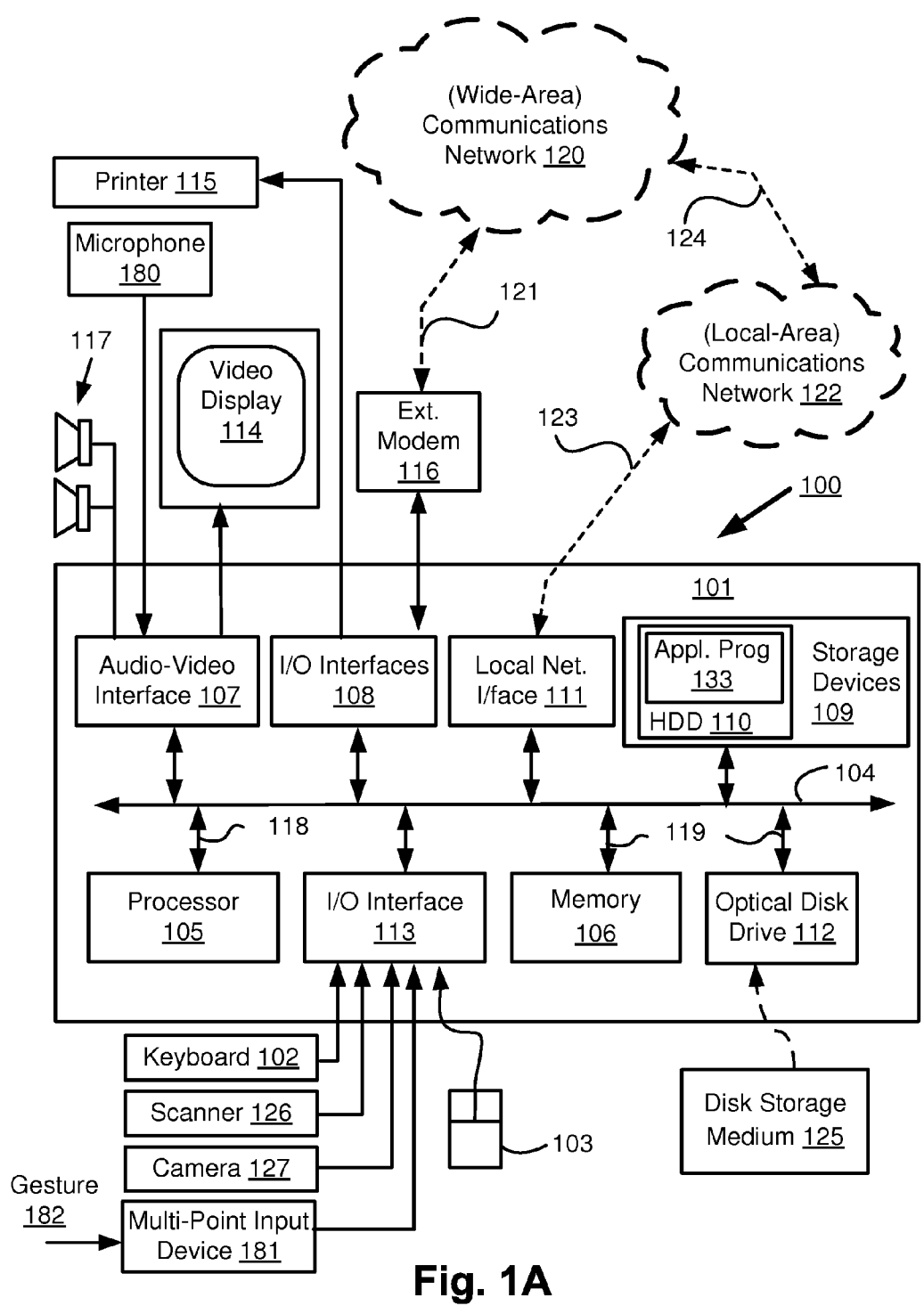
FIGS. 1A and 1B are schematic block diagrams depicting a general-purpose computer system with which described arrangements can be practised.

Methods, apparatuses, and computer readable storage mediums for interfacing with a multi-point input display device are disclosed. In the following description, numerous specific details are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

Computer Implementation

Figure 1B:
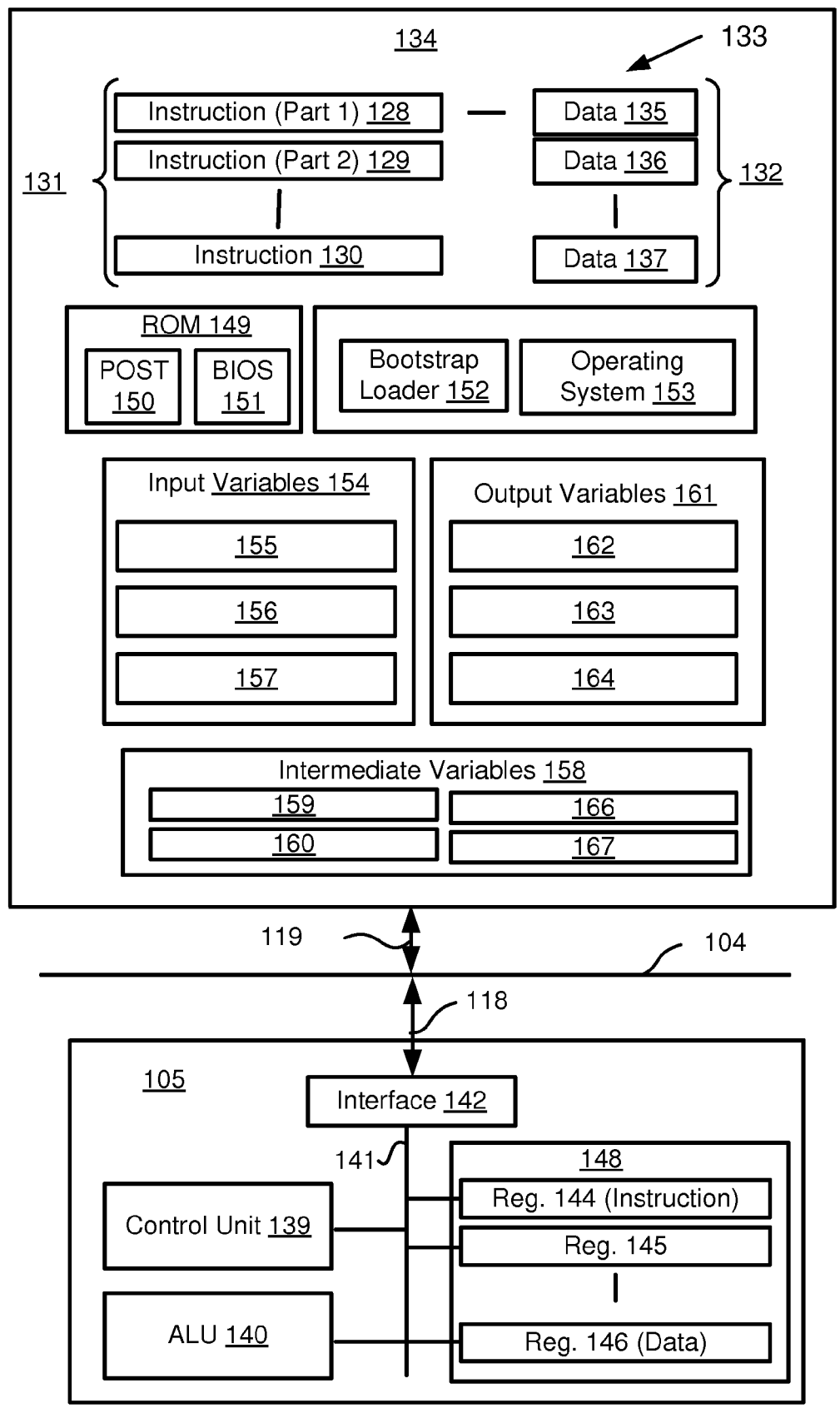

FIGS. 1A and 1B collectively form a schematic block diagram of a general-purpose computer system 100, upon which the embodiments of the invention can be practiced. As described herein, the computer system 100 displays and edits digital images using a multi-point input device.

As seen in FIG. 1A, the computer system 100 includes: a computer module 101; input devices such as a keyboard 102, a mouse pointer device 103, a scanner 126, a camera 127, a multi-point input device 181, and a microphone 180; and output devices including a printer 115, a display device 114 and loudspeakers 117.

A multi-point input device 181 includes any device capable of detecting either a single input, or simultaneously detecting multiple inputs, and sending this information to the processor 105. Examples of the multi-point input device 181 include touch pads, touch screens, multi-touch screens, multi-touch mouses, and multi-touch trackpads. Hereinafter, the terms "multi-point input device", and "multi-touch device" all refer to the example devices mentioned above. Generally, multi-point input devices are capable of detecting the touch inputs, the location of the inputs on the device, and the degree of the input on the touch sensitive surface. The input sensing means sends the input to the processor 105 which then interprets the input accordingly. The processor 105 could interpret the inputs as commands to perform.

The multi-point input device 181 may be based on, but not limited to, sensing technologies such as capacitive sensing, resistive sensing, pressure sensing, optical sensing and/or the like. The multi-point input device 181 may be a touch screen that is positioned over or in front of the video display 114. The multi-point input device 181 may also be integrated with the video display 114 or may be a separate component.

The term "input" or "inputs" are used to refer to any object contacting with the surface of the multi-point input device, whether the object is one or more fingers or another device, such as a stylus. Each input includes an x-coordinate, y-coordinate and an area where the object is contacting the surface of the input device.

The computer system 100 may be designed and configured to recognise gestures 182 applied to the multi-point input device 181 and to control aspects of the computer system 100 based on the gestures 182. The term "gesture" refers to any input, input motion, or combination of input and input motion, which is mapped to one or more computing operations. Examples of relevant computing operations include panning, zooming, rotating, and the like, in respect of a displayed image. A gesture is primarily carried out using various hand or finger motions. Alternatively, a gesture can also be carried out with a stylus.

An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127, multi-point input device 181 and optionally a joystick or other human interface device (not illustrated); and an interface 108 for the external modem 116 and printer 115.

In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

The method of interfacing with the multi-point input display device may be implemented using the computer system 100 wherein the processes described with reference FIGS. 2 to 10, to be described, may be implemented as one or more software application programs 133 executable within the computer system 100. In particular, the steps of the method of interfacing with the multi-point input display device are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the multi-point-input-display-device interfacing methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for interfacing with the multi-point input display device.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for interfacing with the multi-point input display device.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any storage medium that provides recorded instructions and/or data to the computer system 100 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed multi-point-input-display-device interfacing arrangements use input variables 154, which are stored in the memory 134 in corresponding memory locations 155, 156, 157. The multi-point-input-display-device interfacing arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes described with reference to FIGS. 2 to 10 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The method of interfacing with the multi-point input display device may alternatively be implemented in dedicated hardware such as one or more integrated circuits performing the functions or sub functions of interfacing with the multi-point input display device. Such dedicated hardware may include graphic processors, digital signal processors, or one or more microprocessors and associated memories.

Referring to FIGS. 2 to 10, an embodiment of the present invention relating to interfacing with a multi-point input display device using an input gesture is described. The input gesture is used to 'lift' a portion of a visual object displayed on a screen of the display device, so that further visual objects can be either inserted beneath or above the lifted object.

Figure 9:
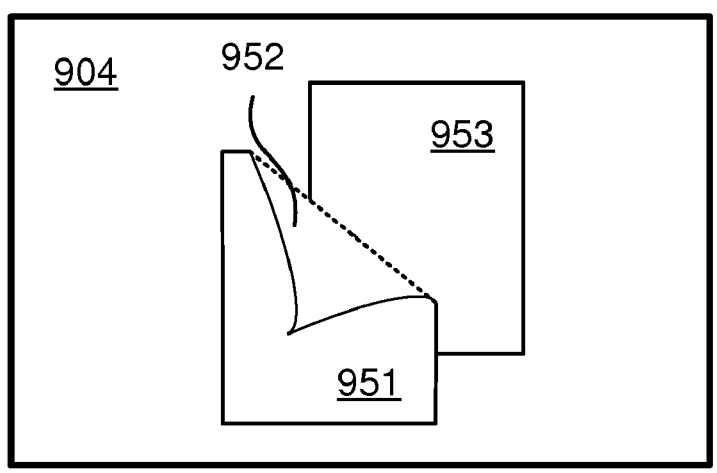
FIG. 9 is a block diagram illustrating the animation applied to the second portion of the upper visual object displayed on a multi-point input display device to give a 'peel back' effect.
Figure 10:
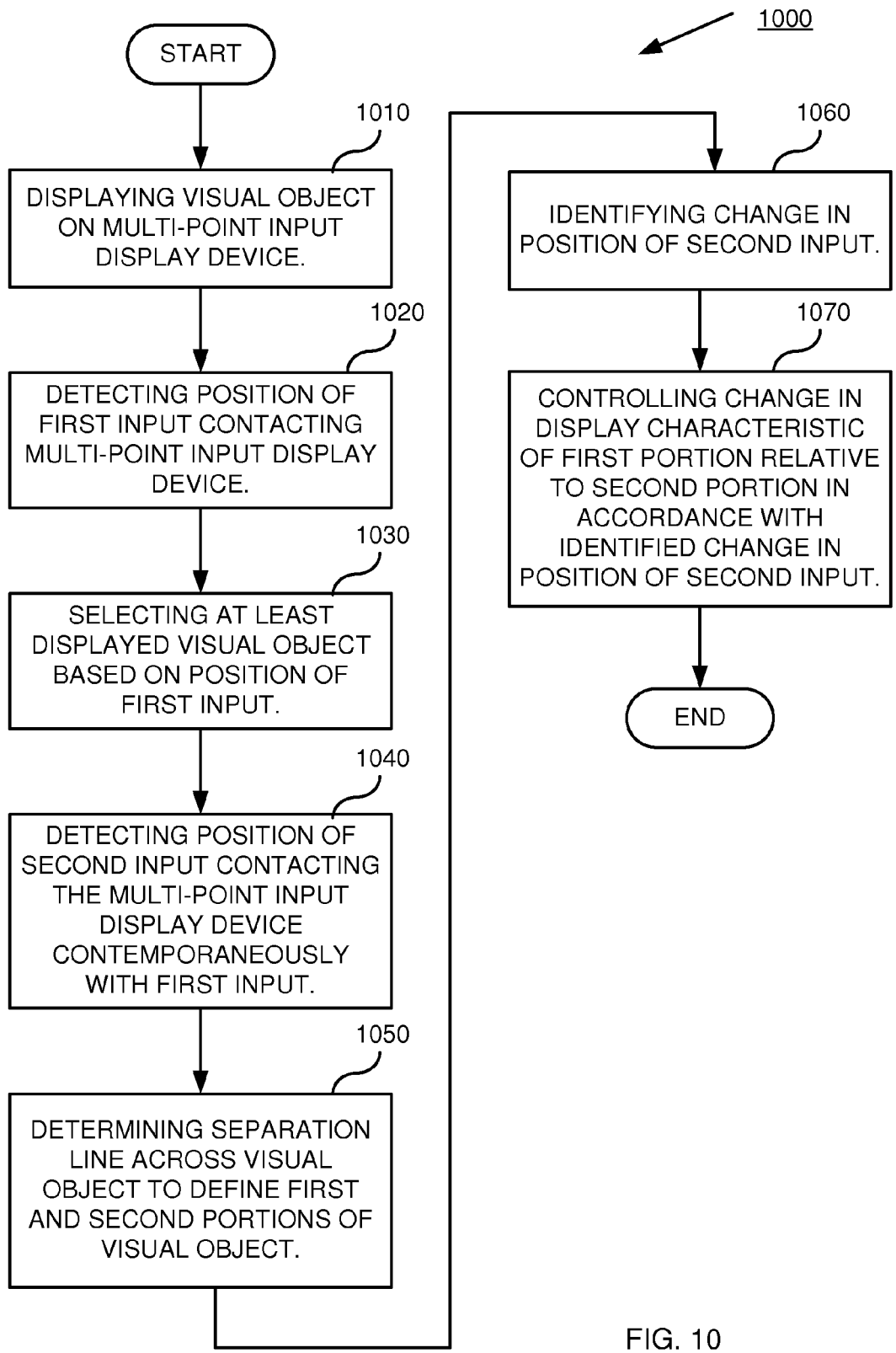
FIG. 10 is a flow diagram illustrating a method of for interfacing with a multi-point input display device.

FIG. 10 is a high-level flow diagram of a method 1000 of interfacing with a multi-point input display device. The method may be computer implemented using the computer system 100 of FIG. 1. In displaying step 1010, a visual object is displayed using the multi-point input display device. In first-input-detecting step 1020, the position of a first input contacting the multi-point input display device is detected. In selecting step 1030, at least the displayed visual object is selected based on the position of the first input. In the second-input-detecting step 1040, the position of a second input contacting the multi-point input display device contemporaneously with the first input is detected. In determining step 1050, a separation line across the visual object is determined so as to define a first portion and a second portion of the visual object. In identifying step 1060, a change in the position of the second input is identified. In change-controlling step 1070, a change in a display characteristic of the first portion relative to the second portion is controlled in accordance with the identified change in the position of the second input. Processing may then terminate. The method 1000 of interfacing is described in greater detail hereinafter with reference to FIGS. 2 to 9.

Figure 2A:
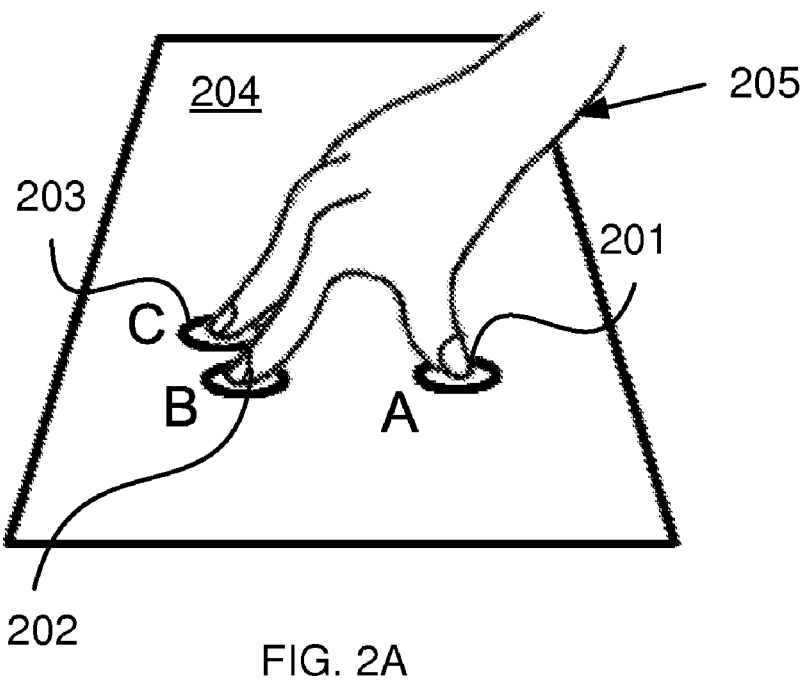
FIGS. 2A and 2B are a schematic diagram illustrating input gestures on a multi-point input display device using the fingers of a user's hand.
Figure 2B:
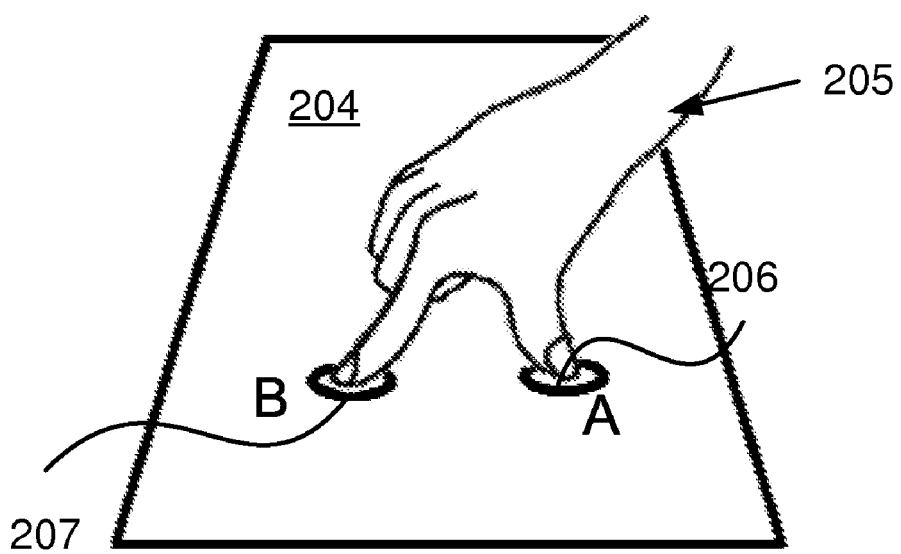
Figure 2C:
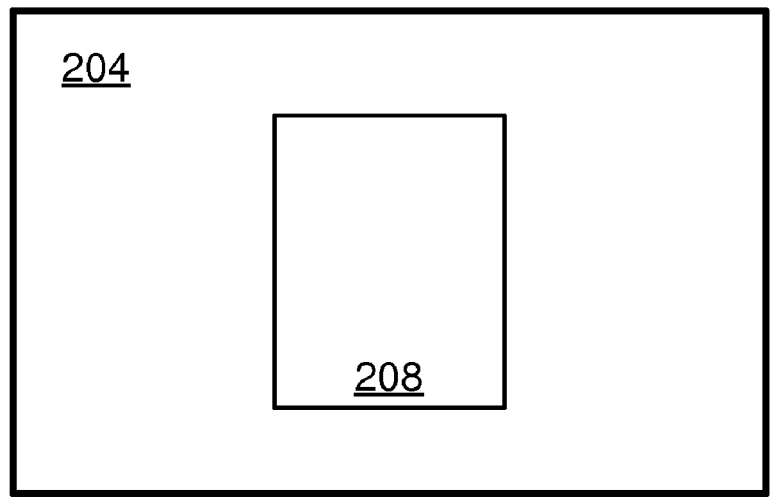
FIG. 2C is a block diagram illustrating a visual object displayed on a multi-point input display device.

The method of interfacing using an input gesture can be implemented in a multi-touch display environment, as shown in FIGS. 2A, 2B and 2C. FIG. 2A shows three gesture inputs "A" 201, "B" 202 and "C" 203 by a user's hand 205 applied to a multi-touch input device 204, such as a multi-touch display. The box 204 represents generically the multi-touch input device. The inputs 201, 202 and 203 are contact points "A", "B" and "C" made on the multi-touch input device 204 by the fingers of the user's hand 205. In this example, the inputs A 201, B 202 and C 203 correspond to the users thumb, index finger and middle finger respectively, however other finger combinations could be used for the inputs A 201, B 202 and C 203. The inputs A 201, B 202 and C 203 are not limited to finger combinations using a single hand and may be performed using finger combinations from multiple hands.

FIG. 2B illustrates a second example of inputs A 206, B 207 on a multi-touch input device 204, such as a multi-touch display. In this example, inputs A 206 and B 207 correspond to the users thumb and index finger, respectively.

FIG. 2C illustrates a visual object 208 (represented by a rectangle) displayed on the multi-touch input device 204. The visual object 208 can be manipulated using input gestures. In the described embodiments, the visual object 208 represents a bitmap image such as a digital photograph. However, the visual object 208 is not limited to digital photographs. For example, the rectangle 208 may represent a page in a book, a sheet of paper, or the like.

Figure 3A:
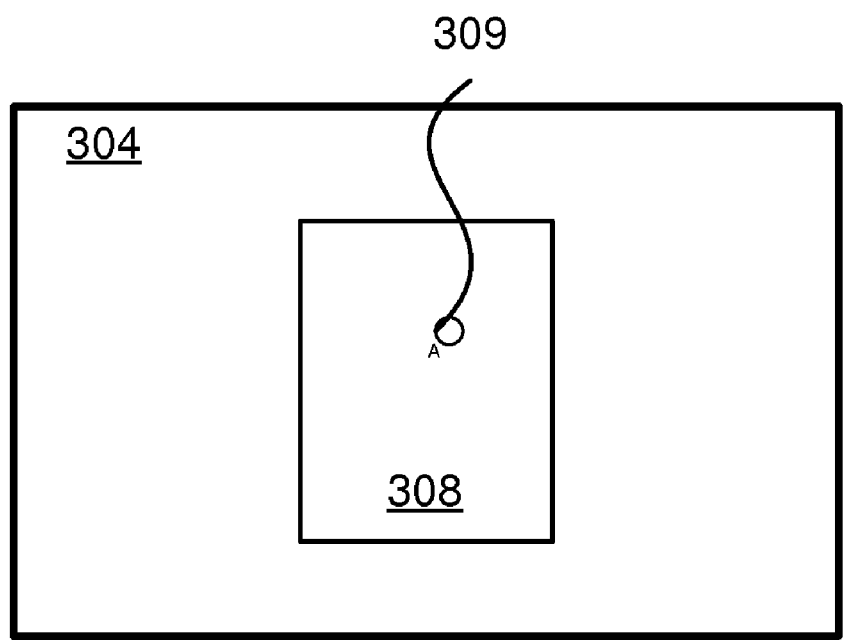
FIGS. 3A and 3B are block diagrams showing one or more initial inputs to a multi-point input display device used to select visual objects for potential manipulation.

FIG. 3A illustrates a visual object 308 displayed on the multi-touch input device 304. The position of a first input point A 309, where a user contacts the multi-touch input device 304, is detected. When the first input point 309 is in a region of the visual object 308 as in FIG. 3A, the displayed visual object 308 is selected. The selected visual object 308 is treated as a potential visual object for manipulation. The input point A 309 is deemed to be within a region of the visual object 308 if any part of the input point A 309 is within the coordinate bounds of the visual object 308.

Figure 3B:
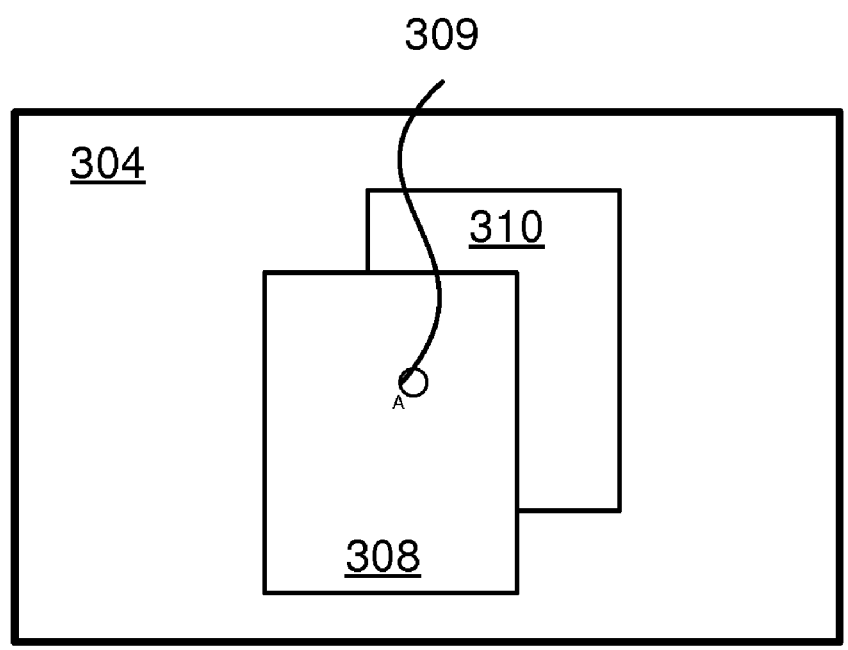

As shown in FIG. 3B, the first input point A 309 intersects with the coordinate bounds of multiple visual objects 308 and 310, all the visual objects 308 and 310 that the first input point A 309 intersects is selected as potential visual objects for manipulation. The input point A 309 is within a region of both the upper visual object 308 and the lower visual object 310. Therefore, both visual objects 308 and 310 are selected as potential visual objects for manipulation. In an alternative embodiment, only the upper visual object 308 shown in FIG. 3B may be selected for manipulation.

Figure 4A:
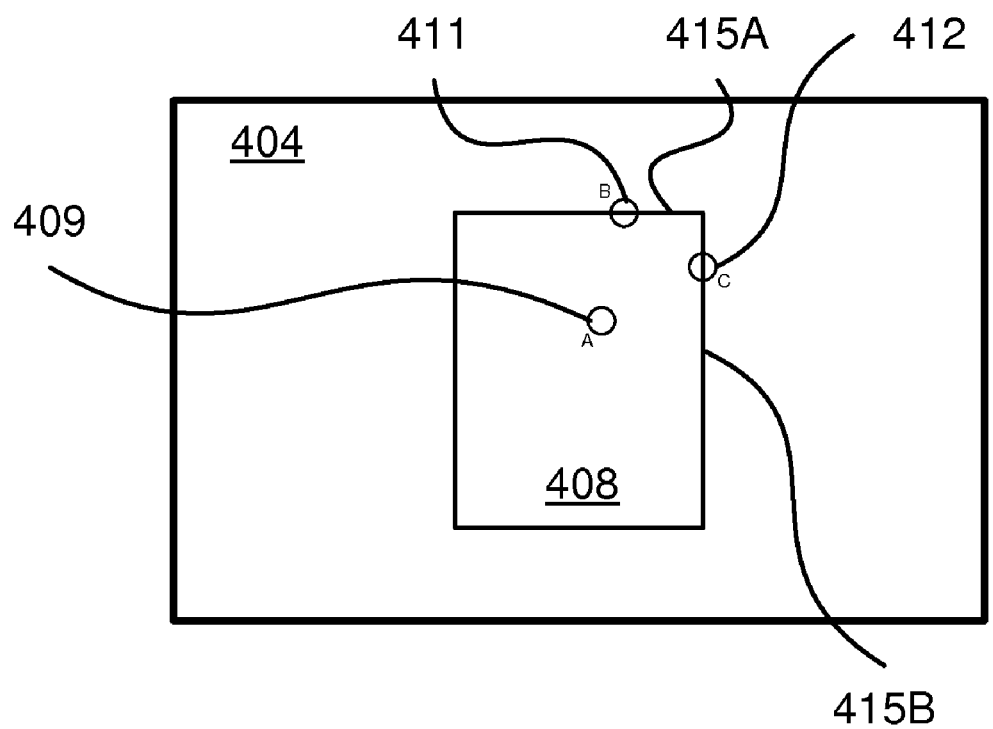
FIGS. 4A and 4B are block diagrams showing second and third inputs to a multi-point input display device used to select a visual object for manipulation.

To select which visual object to manipulate, three input points are used. Referring to FIG. 4A, besides a first input A 409, the positions of a second input B 411 and a third input C 412, respectively, contacting the multi-touch display 404 contemporaneously with the first input A 409, are detected. When the second and third inputs 411, 412 are in a region about an edge 415A, 415B of the visual object 408 that is selected for potential manipulation, the visual object 408 is selected as the desired visual object for manipulation. The second and third inputs 411, 412 are on the top edge 415A and the right edge 415B, respectively, in the vicinity of the corner formed by edges 415A and 415B.

If the input A 409 is within the coordinate bounds of the visual object 408 and inputs B 411 and C 412 are about one or more edges of the same visual object 408, this selects the visual object 408 for manipulation, as shown in FIG. 4A. The inputs B 411 and C 412 are determined to be about an edge of the visual object 408 if the inputs B 411 and C 412 in FIG. 4A intersect with the bounds of the visual object 408, and the points where inputs B 411 and C 412 intersect with the bounds of the visual object 408 are not obscured by another visual object.

In accordance with another embodiment of the invention, only the position of a second input contacting the multi-touch display 404 contemporaneously with the first input A 409 is used in determining the visual object 408 for manipulation. In a further embodiment of the invention, the position of three or more subsequent inputs to the first input A 409 is detected. Additionally, in yet a further embodiment of the invention, the input points subsequent to the first input point A 409 are not bound to an edge of the selected visual object but instead are within a region of the selected visual object.

Figure 4B:
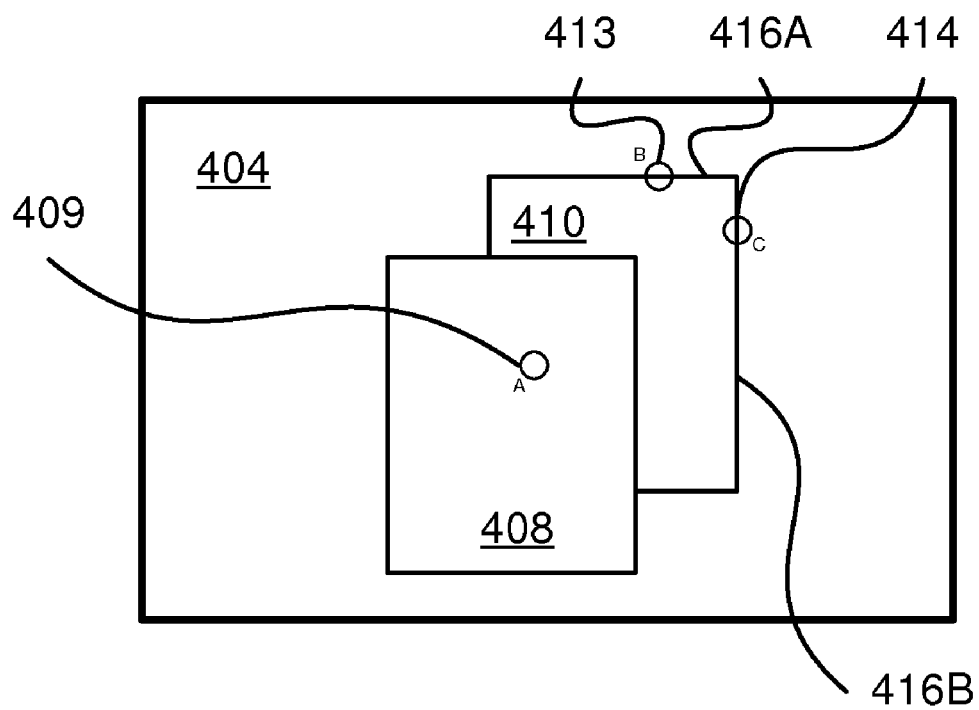

FIG. 4B illustrates selecting a partly obscured visual object 410 for manipulation. Input point A 409 is within a region of both the upper visual object 408, and the underlying visual object 410. The detection of second and third inputs, B and C, 413 and 414 on the lower visual object 410, indicates the lower visual object is the desired visual object for manipulation. The positions of the second and third inputs, B and C, 413 and 414 are on the top edge 416A and the right edge 416B of the underlying visual object 410, as shown in FIG. 4B.

Figure 5:
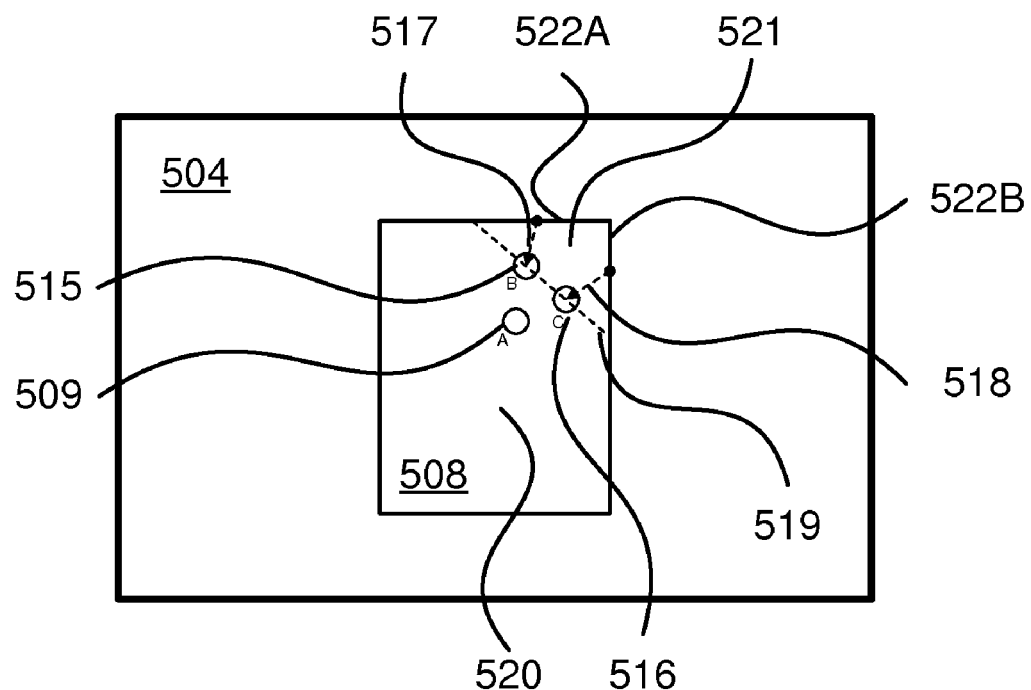
FIG. 5 is a block diagram showing a change in position of second and third inputs to a multi-point input display device, which in turn establishes a separation line that divides the visual object into a first and second portion.

FIG. 5 shows a change in position of the second and third inputs, B and C, 515 and 516 along a first 517 and second 518 vector (indicated by dashed arrows), whilst continuing to maintain a first input A 509 relatively stationary in the visual object 508 on the multi-touch input display device 504. A change in position of inputs B 515 and C 516 is defined as a sliding motion of inputs B 515 and C 516 contemporaneously towards the first input A 509, whereby inputs B 515 and C 516 maintain contact with the multi-point input device 504 at all times of the motion. During the motion, the input A 509 remains relatively stationary and maintains contact with the multi-point input device 504.

When a change in position of inputs B 515 and C 516 occurs, a separation line 519 is calculated to divide the visual object 508 into a first 520 and second 521 portion. In one embodiment, the separation line 519 is determined as a vector extending to the top edge 522A and the right edge 522B of the visual object 508 and intersecting both of the second 515 and third 516 input points, B and C, 515 and 516. The separation line 519 is continually recalculated as inputs B 515 and C 516 change positions. Furthermore, a separation line divides a selected visual object and any visual objects that overlap the selected visual object, into a first and second portion, if the separation line intersects that visual object.

In other embodiments of the invention, the separation line is determined to be a line parallel to a vector intersecting points B 515 and C 516, referred to as vector BC, and existing in a region between point A 509 and vector BC. In accordance with another embodiment of the invention, the separation line is determined to be a line parallel to vector BC, and existing in a region between vector BC and an edge of the selected visual object, i.e. a region that does not encompass point A 509.

In an alternative embodiment of the invention, the separation line may extend substantially perpendicular to an axis extending through a first contact point. For example, in a case where there are three contact points, the axis runs through a first contact point and a point which is located preferably half way between second and third contact points. In another example, where there are two contact points, the axis runs through at least a first contact point, and preferably also a second contact point. The separation line is determined to extend substantially perpendicular to this respective axis.

The separation line 519 is used to define the first portion 520 and the second portion 521 of the visual object 508, as shown in FIG. 5. In one embodiment, the first portion 520 of the visual object 508 is defined as the portion of the visual object 508 from the separation line 519 and encompassing the first input point A 509. The second portion 521 of the visual object 508 is defined as the portion of the visual object 508 on the side of the separation line 519 that does not include the first input point A 509.

The term Z-order refers to the ordering of visual objects displayed on a display device in an axis perpendicular to the plane of the display. Visual objects with a higher Z-order are drawn on top of those visual objects with a lower Z-order. Furthermore, the separation may actually be displayed or may be hidden from view.

In one embodiment of the invention, the first and second portions 520, 521 of the visual object 508 affect the Z-order of other visual objects which the first and second portions 520, 521 intersect. The way the first and second portions 520, 521 affect the Z-order of other objects has been defined to give the appearance that the second portion 521 of the visual object 508 has been 'lifted' above the first portion 520 of the visual object 508. The first portion 520 (and larger portion as depicted in FIG. 5) of the visual object 508 is therefore referred to as the unraised portion, whereas the second portion 521 of the visual object 508 is referred to as the raised portion.

Once the second portion 521 of the visual object 508 is raised and held, subsequent gestures can be applied to insert objects underneath the raised portion 521 of the object 508. Visual objects can be inserted beneath or above one another based on one or more rules in the following set of rules:
1. If a second visual object intersects the raised portion of the first visual object prior to intersecting the unraised portion of the first visual object, the second visual object is inserted beneath the first visual object and any visual objects that are above the first visual object and intersect the first visual object.
2. If the second visual object intersects the unraised portion of the first visual object prior to intersecting the raised portion of the first visual object, the second visual object is inserted above the first visual object and any visual objects that are currently beneath the first visual object and intersect the first visual object.
3. If a first visual object is on top of a second visual object, the first visual object is not inserted beneath the second visual object so long as the first visual object continues to overlap the second visual object.
4. If a first visual object is beneath a second visual object, the first visual object is not inserted above the second visual object so long as the second visual object overlaps the first visual object.

Figure 11A:
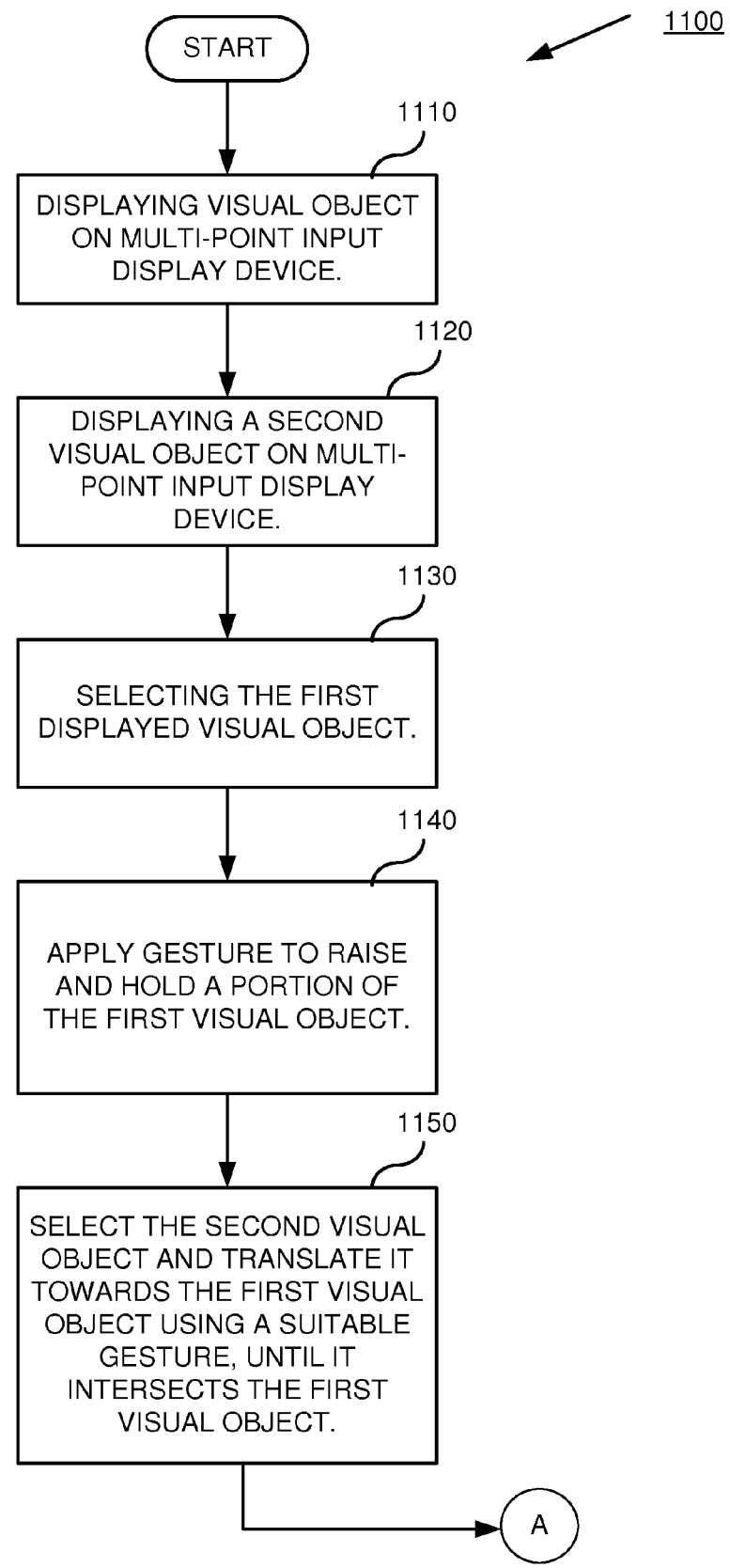
FIGS. 11A and 11B are a high-level flow diagram illustrating a scenario where two non-intersecting visual objects manipulated.
Figure 11B:
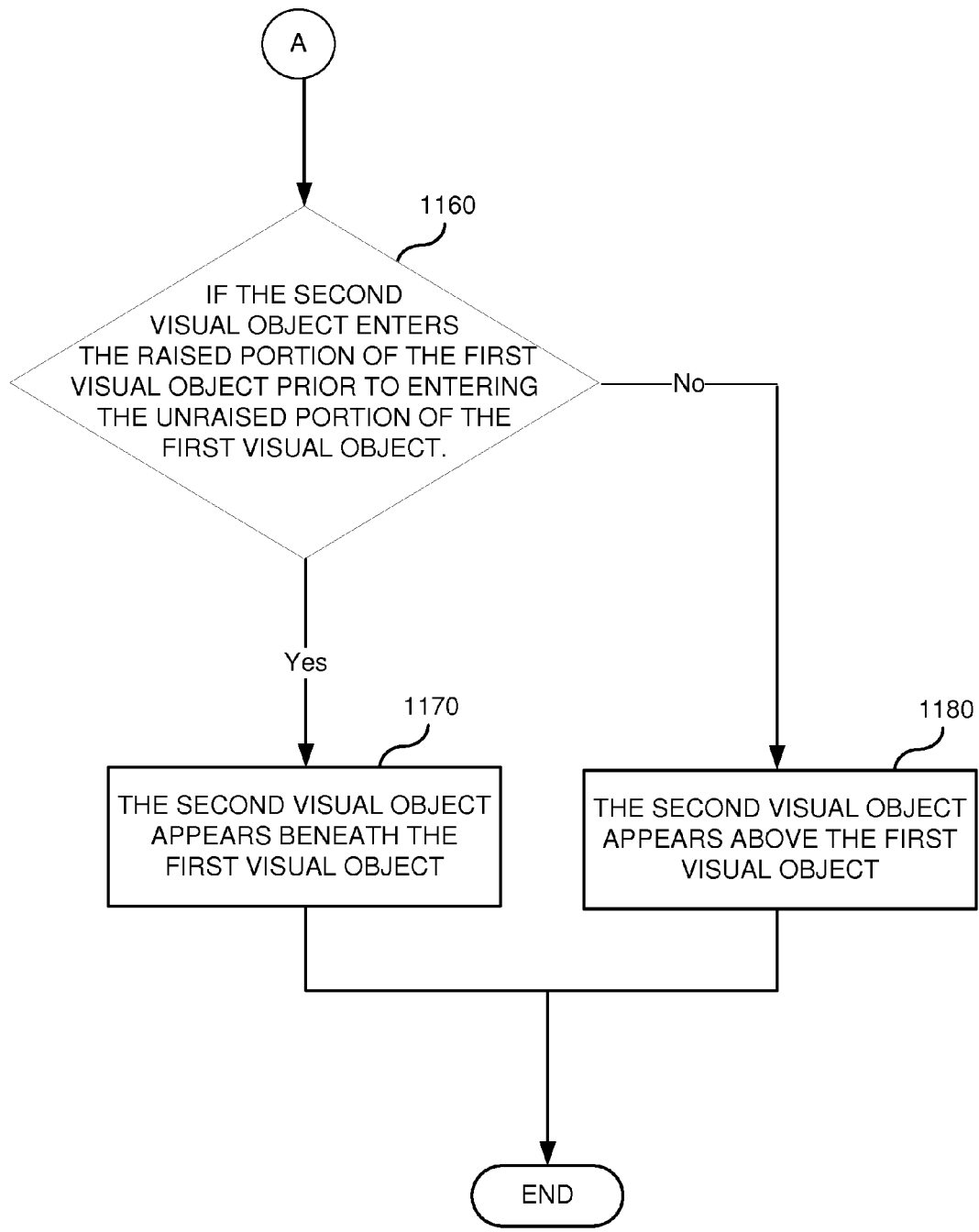

FIGS. 11A and 11B illustrate the manipulation of two non-intersecting visual objects. In step 1110 and 1120 of method 1100 the two visual objects are displayed on a multi-point input display device. The first visual object is then selected in step 1130. In step 1140, a gesture is applied to raise and hold a portion of the first visual object. A raised and unraised portion is divided using the gesture described above 1140. The gesture is held. A subsequent suitable gesture is applied on the second visual object to reposition the second visual object relative to the first visual object in step 1150. The second visual object is selected and translated towards the first visual object using the suitable gesture until the second visual object intersects the first visual object. In decision step 1160, a check is made to determine if the second visual object enters (intersects) the raised portion of the first visual object prior to entering (intersecting) the unraised portion of the first visual object. If decision step returns true (Yes), processing continues at step 1170. In step 1170, the second visual object appears beneath the first visual object 1170. The Z-order of the second object is adjusted so that the Z-order of the second object is lower than the Z-order of the first visual object. Processing then ends. Otherwise, if decision step 1160 returns false (No), processing continues at step 1180. In step 1180, the second visual object appears above the first visual object. In the case where the second visual object intersects the unraised portion prior to intersecting the raised portion of the first visual object, the Z-order of the second visual object is adjusted so that the Z-order of the second visual object is higher than that of the first visual object. Processing then ends. The scenario 1100 is described in greater detail hereinafter with reference to FIGS. 6 and 7.

Figure 6A:
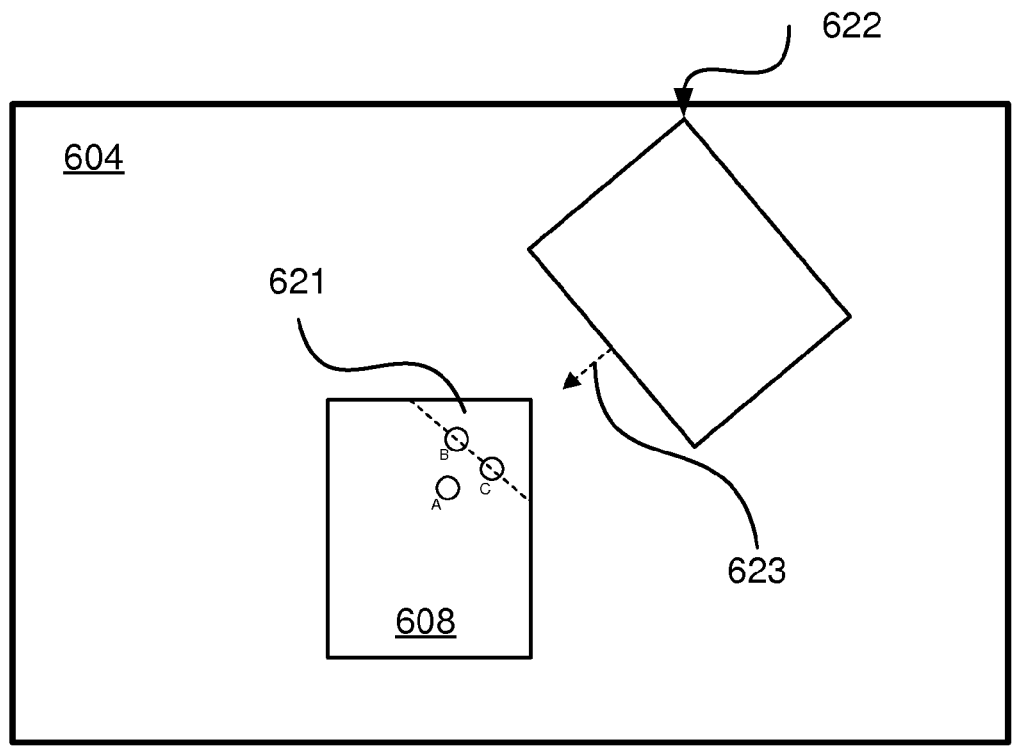
FIGS. 6A, 6B, 6C and 6D are block diagrams illustrating inserting a second visual object displayed on a multi-point input display device beneath a first visual object using input gestures.

In FIG. 6A, a second portion 621 of a first visual object 608 is raised and held. A second visual object 622 of equal Z-ordering is translated towards the first visual object 608. The second visual object 622 is translated, by dragging or some other suitable gesture, towards the first visual object 608 in the direction indicated by the illustrated vector 623.

Figure 6B:
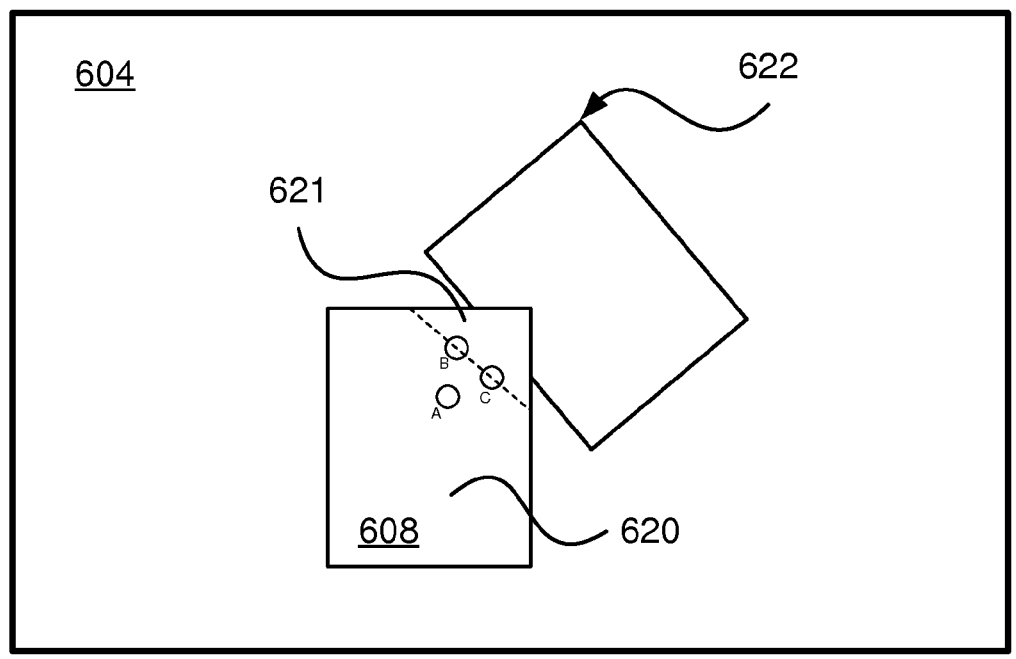

In FIG. 6B, the second visual object 622 is translated so that the second visual object 622 enters the raised portion 621 of the first visual object 608 prior to entering the unraised portion 620 of the first visual object 608. When this occurs, the second visual object 622 appears beneath the first visual object 608.

The second visual object 622 is determined to have entered the raised portion 621 of the first visual object 608 when the coordinate bounds of the second visual object 622 intersects the coordinate region of the second portion 621 of the first visual object 608. When the second visual object 622 intersects the raised portion 621 of the first visual object 608 prior to intersecting the unraised portion 620 of the first visual object 608, the Z-order of the second visual object 622 is temporarily adjusted. The Z-order of the second visual object 622 is temporarily adjusted so that the Z-order of the second visual object 622 is lower than the Z-order of the first visual object 608. This results in the second visual object 622 appearing beneath the first visual object 608.

Figure 6C:
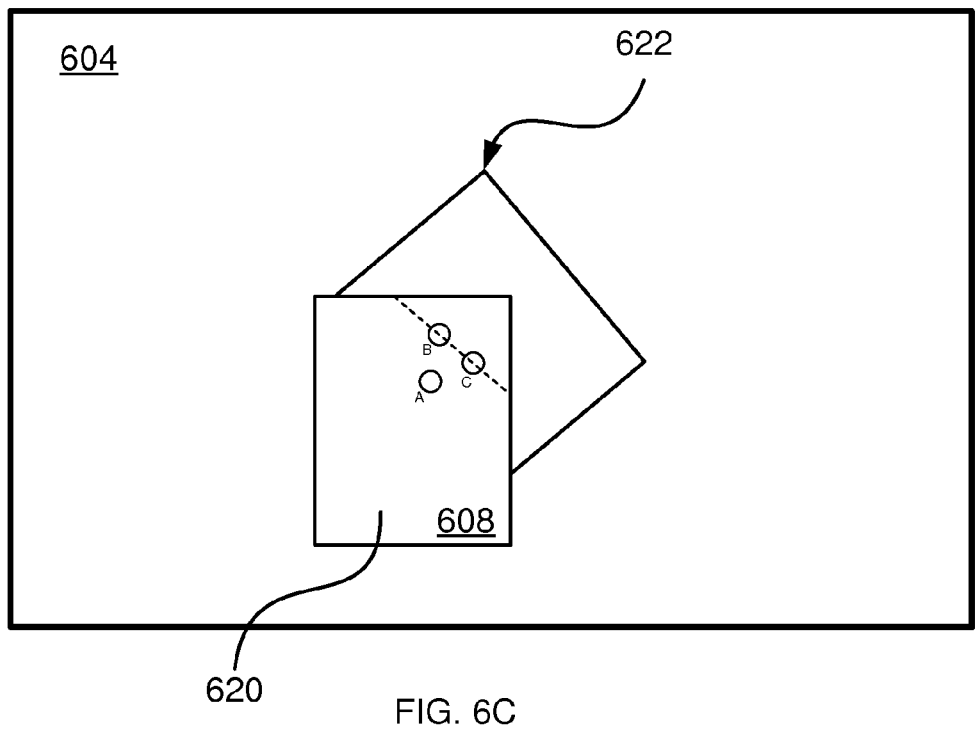

If the second visual object 622 continues to be translated so that the intersection of the second visual object 622 with the first visual object 608 begins to overlap the unraised portion 620 of the first visual object 608, the second visual object 622 continues to be inserted beneath the first visual object 608. This is illustrated in FIG. 6C.

Figure 6D:
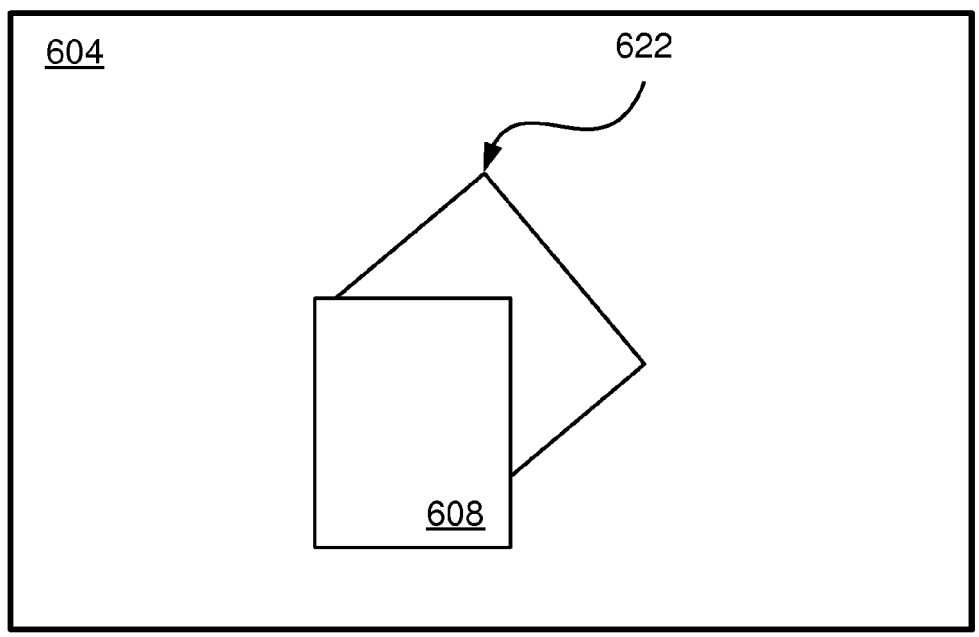

Once any of the input points to the multi-touch input display device 604 are released, any temporary Z-order adjustments are made permanent. In FIG. 6D, all the input points on the first visual object 608 are released. The separation line is no longer present, and the first visual object 608 is no longer divided into two portions. The second visual object 622 has a lower Z-order than the first visual object 608 and is now drawn below the first visual object.

Figure 7A:
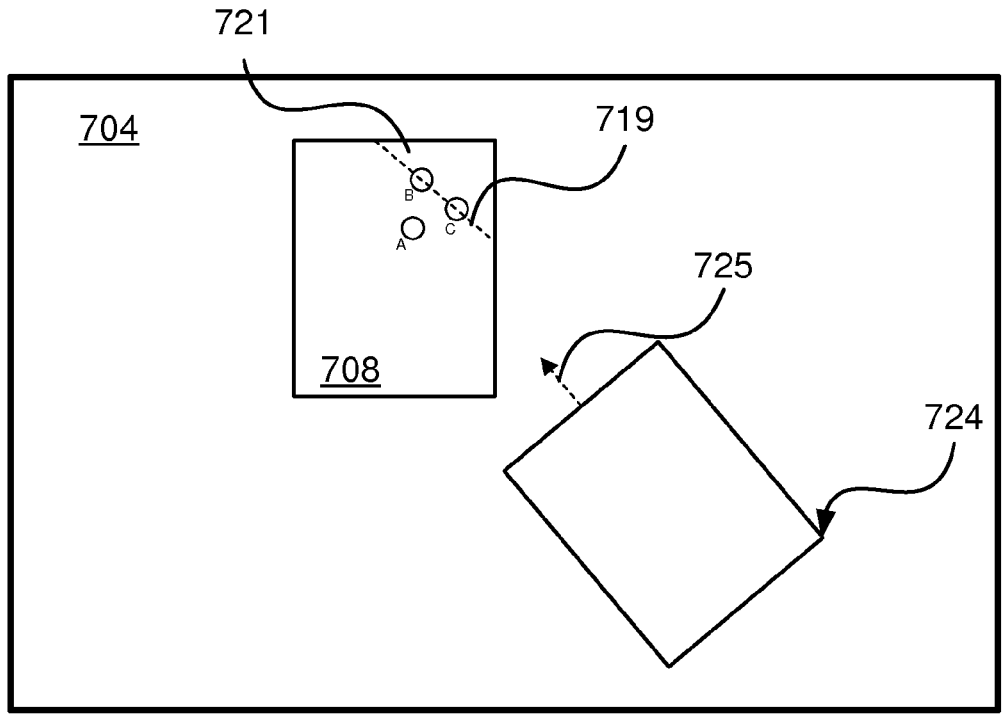
FIGS. 7A, 7B, 7C and 7D are block diagrams illustrating inserting a second visual object above a first visual object displayed on a multi-point input display device, and how the separation line on the first visual object affects the second visual object.
Figure 7B:
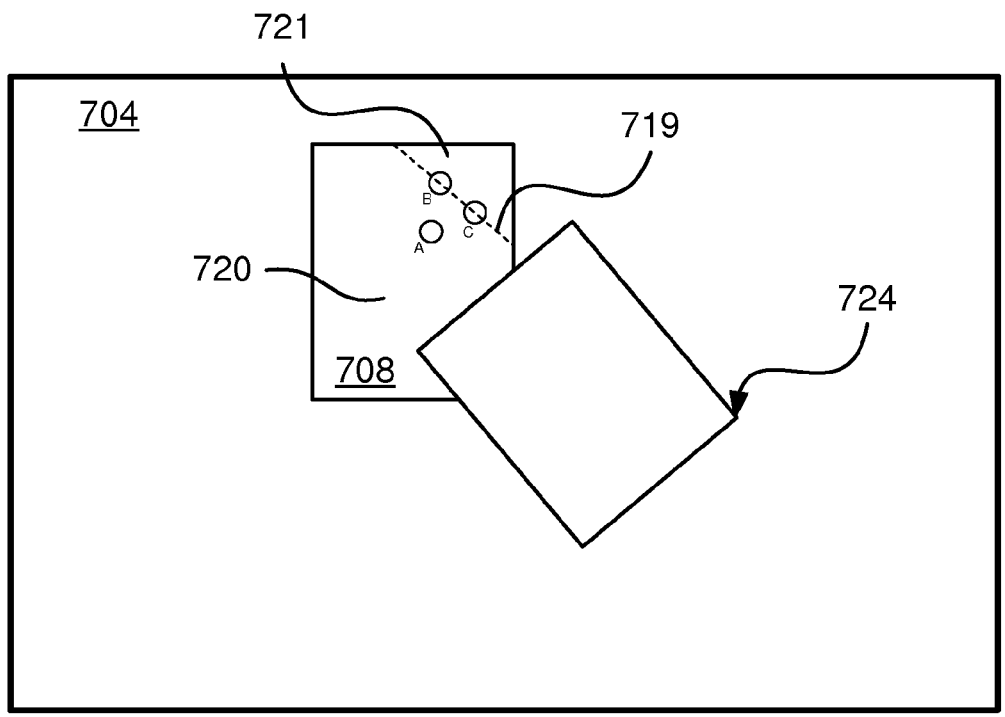

In FIG. 7A, a portion 721 of the first visual object 708 displayed on the multi-touch input display device 704 is raised and held, and a second visual object 724 of equal Z-ordering is translated towards the first object 708. The second visual object 724 is translated towards the first visual object 708 in the direction indicated by the illustrated vector 725. As illustrated in FIG. 7B, the second object 724 initially intersects the unraised portion 720 of the first visual object 708. When this occurs, the second visual object 724 is drawn on top of the first visual object 708.

The second visual object 724 is determined to have entered the unraised portion 720 of the first visual object 708 when the coordinate bounds of the second visual object 724 intersects the coordinate region of the first portion 720 of the first visual object 708. When the second visual object 724 intersects the unraised portion 720 of the first visual object 708 prior to intersecting the raised portion 721 of the first visual object 708, the Z-order of the second visual object 724 is temporarily adjusted. The Z-order of the second visual object 724 is temporarily adjusted so that the Z-order of the second visual object 724 is higher than the Z-order of the first visual object 708. This results in the second visual object 724 being displayed above the first visual object 708.

Figure 7C:
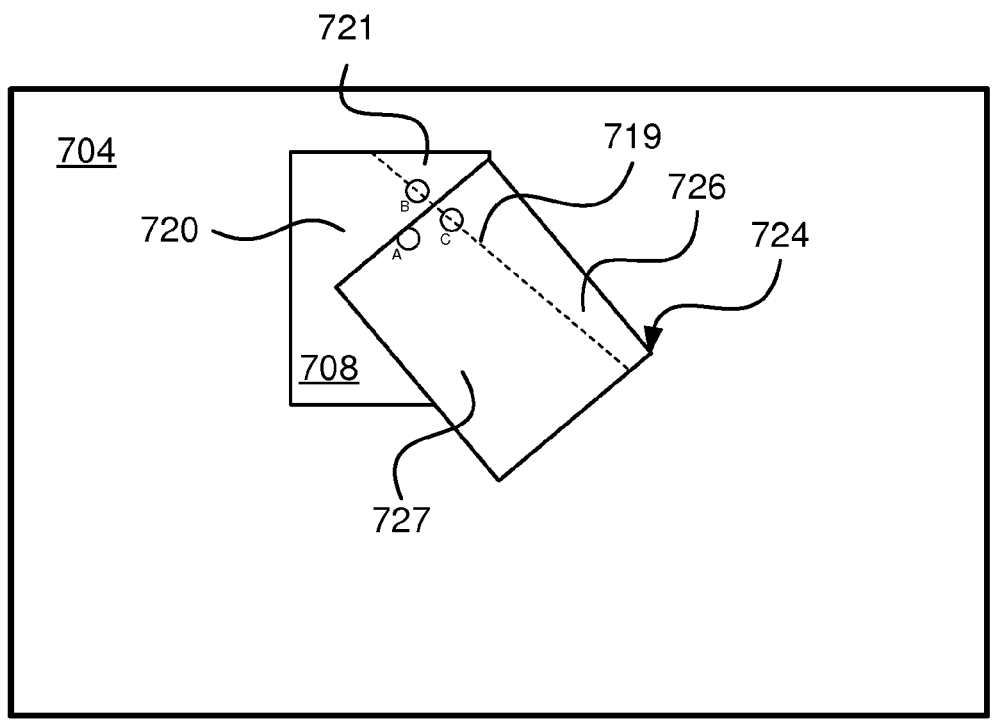

In reference to FIG. 7C, if the second visual object 724 continues to be translated across the display of the multi-touch input display device 704 so that the second visual object 724 begins to overlap the raised portion 721 of the first object 708, a separation line 719 starts affecting the second visual object 724. The second visual object 724 is determined to overlap the raised portion 721 of the first visual object 708, when the coordinate region of the second visual object 724 intersects the coordinate region of the raised portion 721 of the first visual object 708. In this situation the vector defining the separation line 719 extends over the second visual object 724, dividing the second visual object 724 into a raised portion 726 and an unraised 727 portion. The raised 726 and unraised 727 portions of the second visual object 724 have a higher Z-order than the raised portion 721 and the unraised portion 720 of the first visual object 708.

The raised portion 726 and the unraised portion 727 of the second visual object 724 behave in the same fashion as the raised portion 721 and the unraised portion 720 of the first visual object 708. Therefore, a further third visual object can be inserted above or beneath the second visual object 724. Also, a third visual object can be inserted in between the first visual object 708 and the second visual object 724.

Figure 7D:
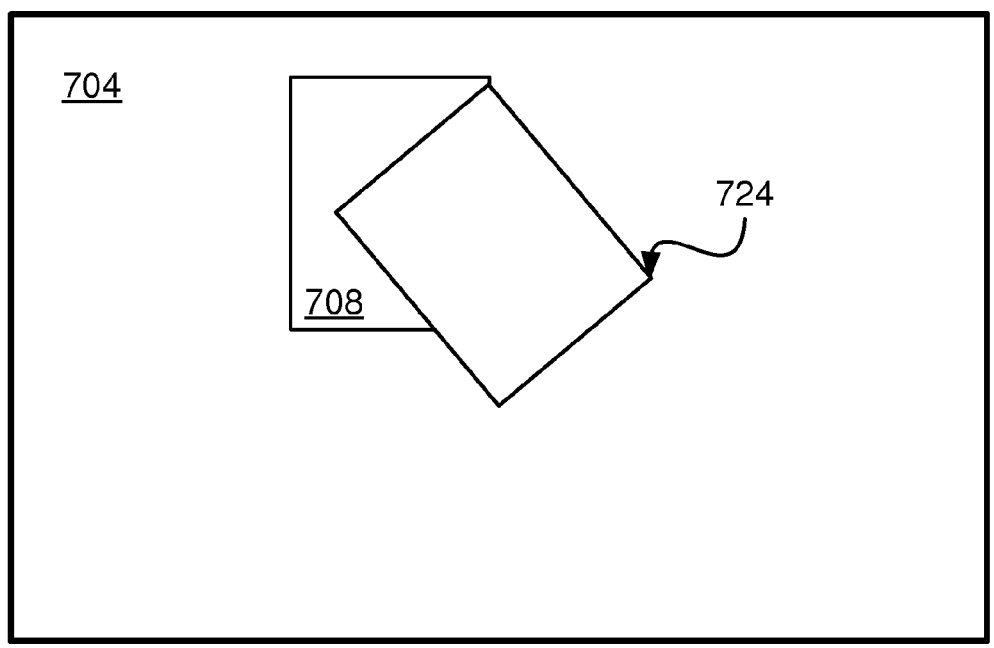

Once any of the input points to the multi-touch input display device 704 are released, any temporary Z-order adjustments are made permanent. FIG. 7D shows all the input points on the first visual object 708 having been released. The separation line is no longer present, and the first and second visual objects 708, 724 are no longer each divided into two portions. The second visual object 724 has a higher Z-order than the first visual object 708 and is now displayed above the first visual object 708.

Figure 12:
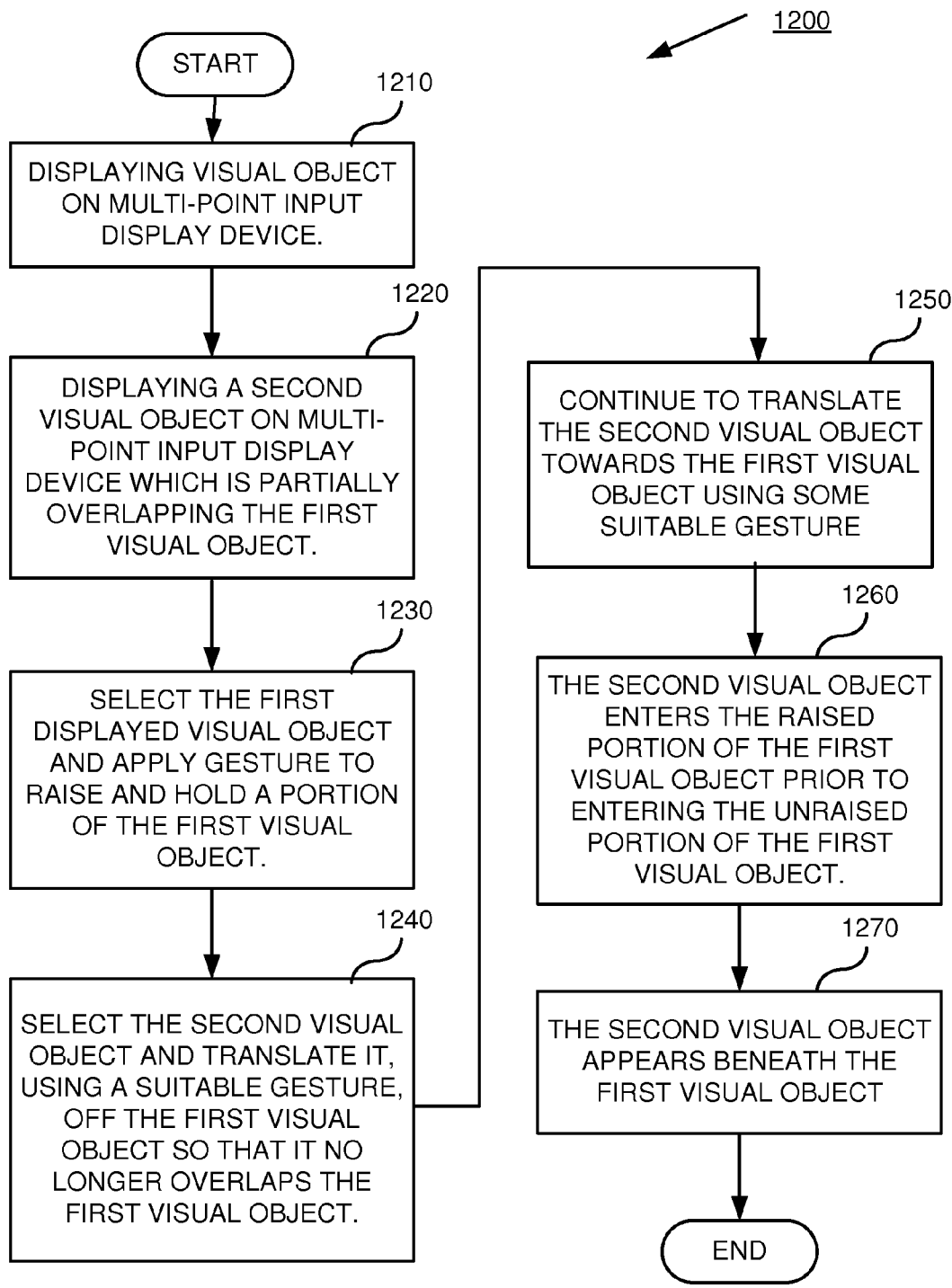
FIG. 12 is a high-level flow diagram illustrating a scenario where two intersecting visual objects are manipulated.

FIG. 12 illustrates the manipulation of two intersecting visual objects. The two visual objects are initially displayed overlapping each other. The method 1200 commences processing at step 1210. In step 1210 and 1220, the two visual objects are displayed on the multipoint input display device. The second visual object partially overlaps the first visual object. In step 1230, the first displayed visual object is selected and a gesture is applied to raise and hold a portion of the first visual object. The first visual object is selected and divided into a raised and unraised portion in step 1230 using the gesture described above. The gesture is held, and a subsequent suitable gesture is applied on the second visual object to reposition the second visual object relative to the first visual object so that the second visual object no longer overlaps the first visual object 1240. The second visual object continues to be translated towards the first visual object until the second visual object intersects the first visual object in step 1250. If the second visual object intersects the raised portion of the first visual object prior to intersecting the unraised portion of the first visual object in step 1260, the Z-order of the second object is adjusted so that the Z-order of the second object is lower than the Z-order of the first visual object. The second visual object therefore appears beneath the first visual object in step 1270. The process 1200 is described in greater detail hereinafter with reference to FIG. 8.

Figure 8A:
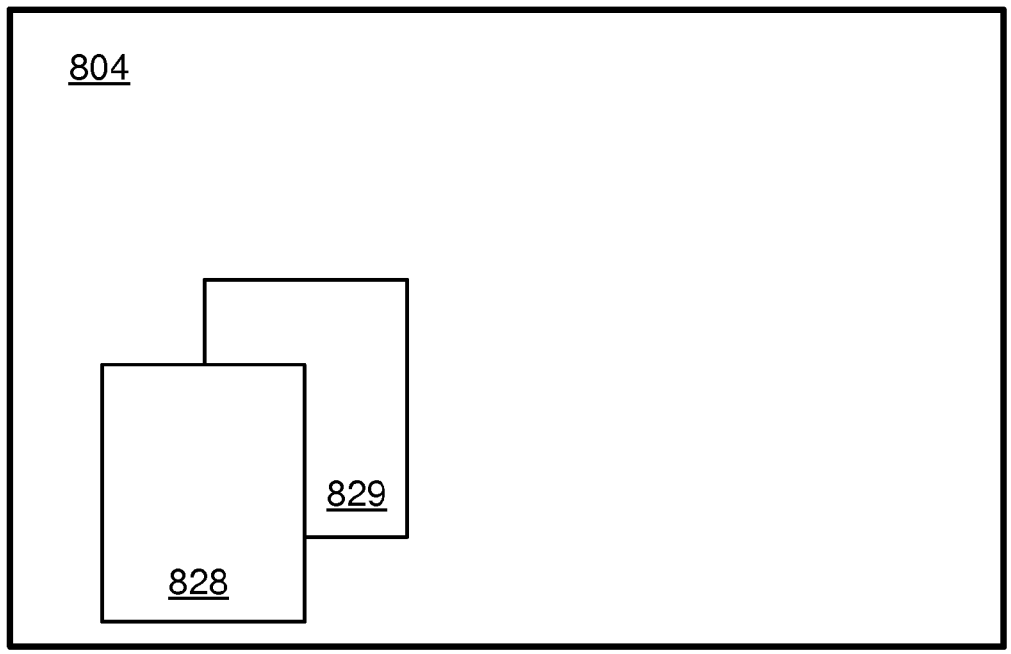
FIGS. 8A to 8G are block diagrams illustrating inserting a second visual object beneath a first visual object displayed on a multi-point input display device, if the second visual object is initially on top of the first visual object.

In a scenario where two visual objects are initially displayed overlapping on a multi-touch input display device 804, as illustrated in FIG. 8A, a visual object with the higher Z-order is the upper visual object 828, whilst an object with the lower Z-order is the lower visual object 829. Whilst the two objects 828, 829 continue to overlap, the Z-order of the lower visual object 829 with respect to the upper object 828 remains the same. To place the upper visual object 828 beneath the lower visual object 829, the upper visual object 828 is first moved off the lower visual object 829. Once the upper visual object 828 is not on top of the lower visual object 829, the upper visual object 828 can be inserted beneath the lower visual object 829.

Figure 8B:
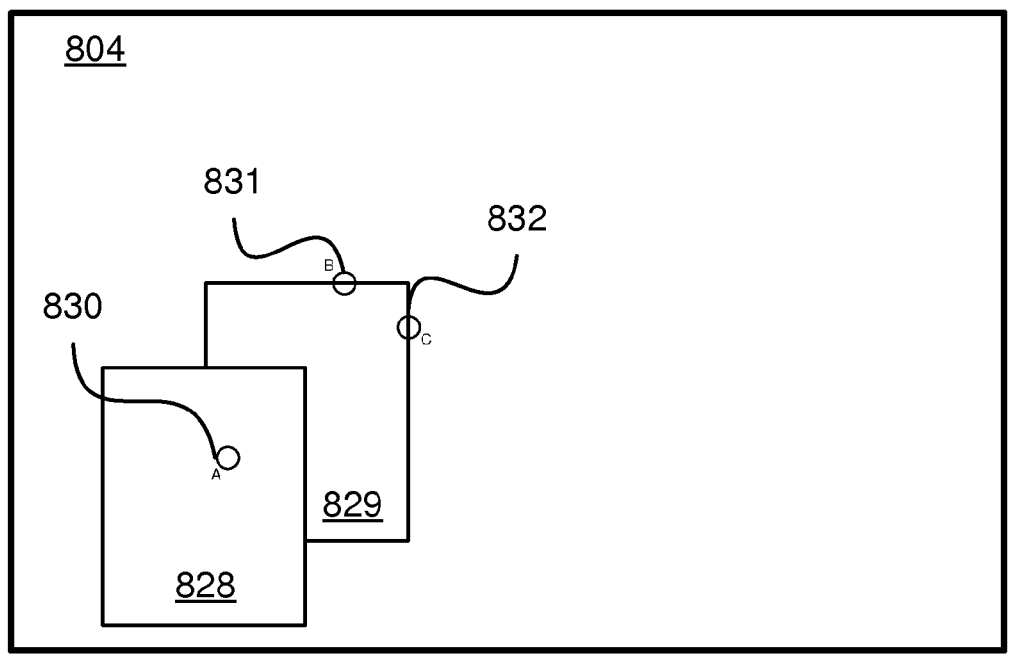

In FIG. 8B, the first, second and third input points A 830, B 831 and C 832, respectively, to the multi-touch input display device 804 are applied to the lower visual object 829, selecting the lower visual object 829 for manipulation. The input A 830 to the device 804 applies to the upper and lower visual objects 828, 829. The inputs B 831 and C 832 apply to the lower visual object 829 in the manner described hereinbefore with reference to FIG. 4B.

Figure 8C:
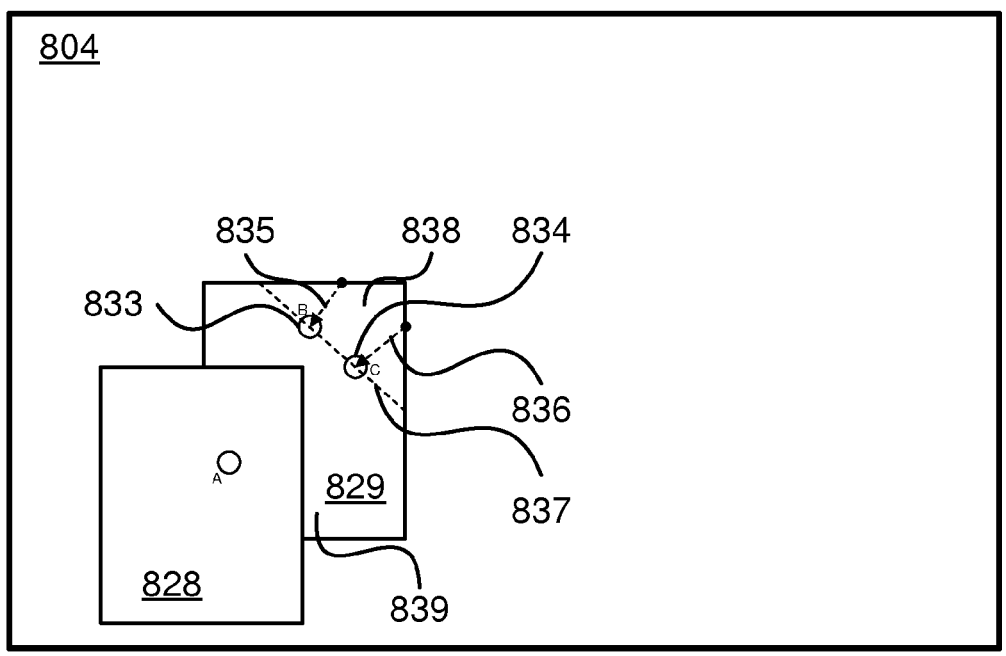

In FIG. 8C, second 833 and third 834 inputs on the lower visual object 829 displayed on the device 804 begin to change positions along a first vector 835 and a second 836 vector. The change in the positions of the second and third points B 833 and C 834 causes the separation line 837 to be established, as described hereinbefore, on the lower visual object 829, dividing the lower visual object 829 into a raised portion 838 and an unraised portion 839. Since the upper visual object 828 is initially on top of the lower visual object 829, the upper visual object 828 remains above the lower visual object 829.

Figure 8D:
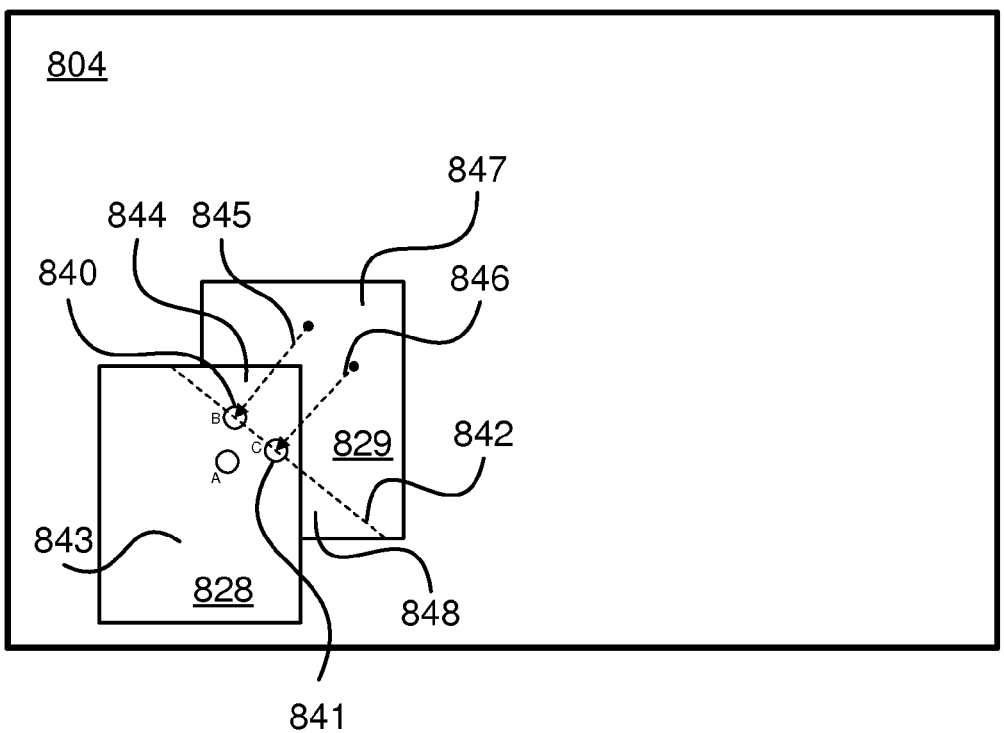

If the second and third inputs 840, 841 continue to change so that the separation line 842 begins to intersect a region of the upper visual object 828 which overlaps the lower visual object 829, the upper visual object 828 is also divided into a first portion 843 and a second portion 844 with respect to the separation line 842. This is illustrated in FIG. 8D where inputs B 840 and C 841 have continued to move along a third vector 845 and a fourth vector 846, respectively, to their new positions. The raised portion 844 and the unraised portion 843 of the upper visual object 828 are on top of the raised and unraised portions 847, 848 of the lower visual object 829.

Figure 8E:
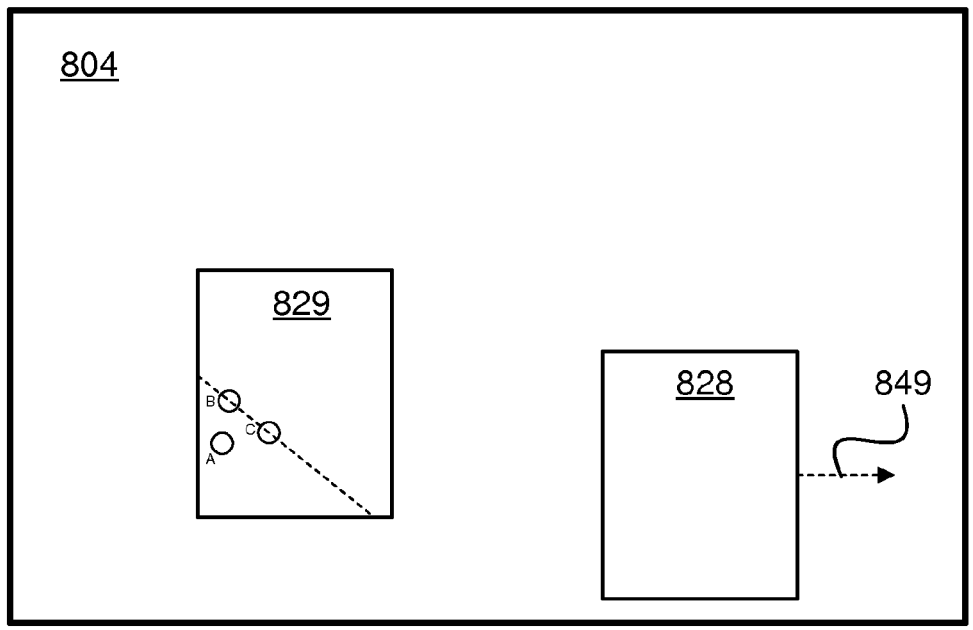

To insert the upper visual object 828 beneath the lower visual object 829, the upper visual object 828 is translated so that the coordinate region of the upper visual object 828 does not intersect the coordinate region of the lower visual object 829. In FIG. 8E, the upper visual object 828 has been translated so that the upper visual object 828 no longer overlaps the lower visual object 829, in the direction indicated by the illustrated vector 849.

Figure 8F:
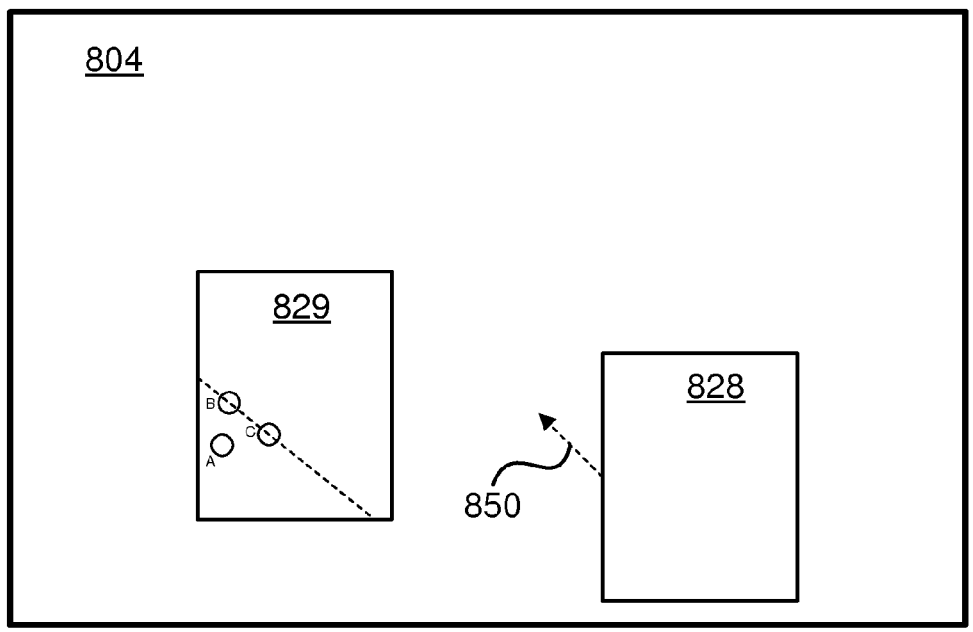

Once the upper and the lower visual objects 828 and 829 have been separated so that the upper and the lower visual objects 828 and 829 do not intersect, the upper visual object 828 is translated in the direction indicated by the shown vector 850 in FIG. 8F.

Figure 8G:
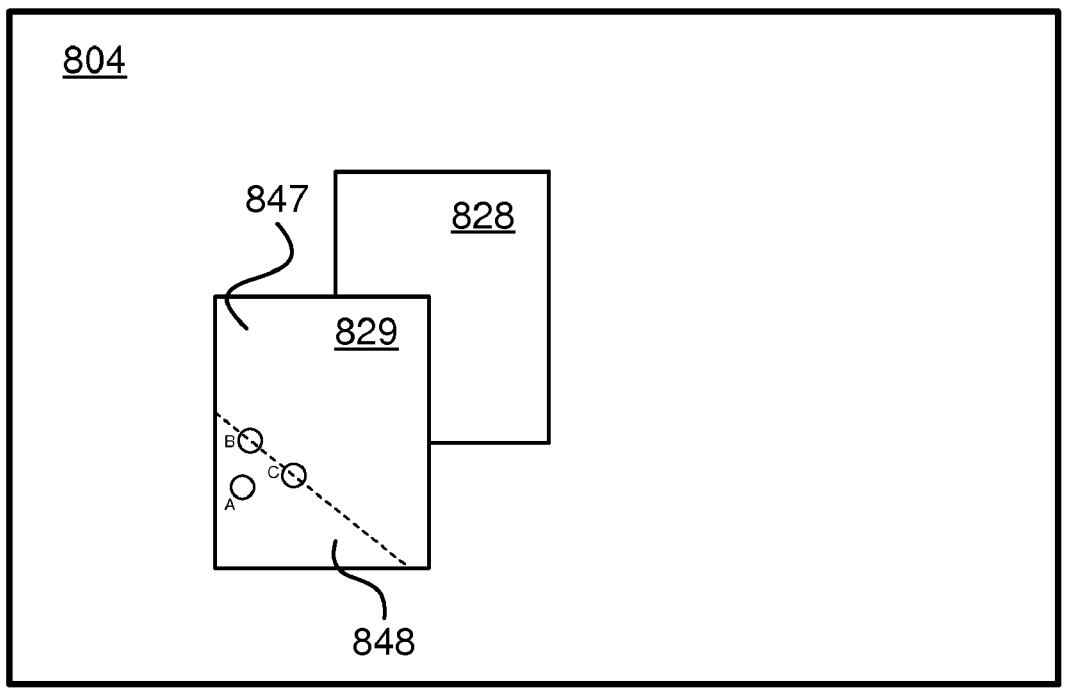

Referring to FIG. 8G, the upper visual object 828 intersects the raised portion 847 of the lower visual object 829 prior to intersecting the unraised portion 848 of the lower visual object 829, and therefore the upper visual object 828 is inserted beneath the lower visual object 829.

In a further aspect of the present invention, when a visual object is divided into first and second portions, the second portion is animated to give the appearance that the second portion is being folded back like, for example, a piece of paper. The applied visual effect has two main aspects:

1) The area that the second portion was originally occupying now reveals any objects which were previously hidden beneath the second portion, and
2) The underside of the second portion is displayed in a curled back effect over the first portion of the visual object, to resemble the appearance of paper being peeled back.

FIG. 9 illustrates an upper visual object 951 on a displayed a multi-touch input display device 904 that has been divided into a first and second portion. The second portion has been animated to illustrate the fold back appearance, with the underside 952 of the upper visual object 951 being displayed. The region of the lower visual object 953 which intersects with the raised portion of the upper visual object 951 is also visible. In addition, or alternatively, the transparency of the second portion, or in some cases the entire visual object 951, may be increased to allow hidden objects to show through, or at least partly show through.

Industrial Applicability

The arrangements described are applicable to the computer and data processing industries and particularly for applications of multi-touch input display devices.

Methods, apparatuses, and computer readable storage mediums for interfacing with a multi-point input display device have been described. The data is encoded using the relative positions of constructed sparse patterns arranged in an overlaid manner within a target area. The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of interfacing with a display device, said method comprising steps of:
    displaying at least two visual objects on a display device;
    detecting a single position of a first input contacting the display device,
    selecting a first displayed visual object based on the single position of the first input;
    detecting a single position of a second input contacting the display device;
    defining a first portion and a second portion of the first displayed visual object;
    identifying a change in the single position of the second input;
    controlling a change in a display characteristic of the first portion relative to the second portion of the first displayed visual object in accordance with the identified change in the single position of the second input;
    detecting a movement of a second displayed visual object on the display device; and
    detecting a relative z-order of the first displayed visual object and the second displayed visual object in accordance with the detected movement of the second displayed visual object relative to the changed display characteristic of the first portion of the first displayed visual object.

2. The method as claimed in claim 1, wherein the second input contacts the display device in a region of an edge of the first displayed visual object.

3. The method as claimed in claim 1, wherein a separation line across the first displayed visual object defines the first portion and the second portion of the first displayed visual object, the separation line being substantially perpendicular to an axis extending through at least the first input.

4. The method as claimed in claim 1, wherein the display characteristic defines an ordering of two or more visual objects displayed on the input display device in a z-order axis perpendicular to a plane of the display of the display device.

5. The method as claimed in claim 1, wherein a gesture is performed by two or more inputs to the display device.

6. The method as claimed in claim 1, wherein any of a user's fingers is used to contact the display device.

7. The method as claimed in claim 6, wherein a user contacts said display device to provide said first input and the second input using one or more hands.

8. The method as claimed in claim 1, wherein each of the at least two visual objects is a digital image, a digital photograph, a bitmap, a photo album, or a page in a book.

9. The method as claimed in claim 1, wherein the second input contacting the display device is within a region of the first displayed visual object.

10. The method as claimed in claim 1, further comprising a step of detecting a single position of at least a third input contacting the display device contemporaneously with the first input.

11. The method as claimed in claim 10, wherein said second input and the third input contacting said display device are translated.

12. The method as claimed in claim 1, wherein a further visual object is displayed being at least partly overlaid by said first displayed visual object.

13. The method as claimed in claim 1, further comprising a step of performing an animated peel back of a portion of the first displayed visual object dependent upon said second input being translated.

14. The method as claimed in claim 13, wherein an underlying object is at least partly displayed by said animated peel back.

15. The method as claimed in claim 13, wherein a portion of an underside of the first displayed visual object is displayed by said animated peel back.

16. The method as claimed in claim 13, wherein the display characteristic is represented as a fold in the first displayed visual object, the first portion being flat and the second portion being folded.

17. The method as claimed in claim 1, wherein the display device is a multi-point input display device.

18. The method as claimed in claim 1, wherein the single position of the second input contacting the display device is detected contemporaneously with the first input.

19. An apparatus for interfacing with a display device, comprising:
    a memory for storing data and a computer program; and a processor coupled to the memory for executing the computer program, said memory and said processor configured to interface with the display device, the computer program comprising:

code for displaying at least two visual objects on a display device;

code for detecting a single position of a first input contacting the display device;

code for selecting a first displayed visual object based on the single position of the first input;

code for detecting a single position of a second input contacting the display device;

code for defining a first portion and a second portion of the first displayed visual object;

code for identifying a change in the single position of the second input;

code for controlling a change in a display characteristic of the first portion relative to the second portion of the first displayed visual object in accordance with the identified change in the single position of the second input;

detecting a movement of a second displayed visual object on the display device; and detecting a relative z-order of the first displayed visual object and the second displayed visual object in accordance with the detected movement of the second displayed visual object relative to the changed display characteristic of the first portion.

20. A non-transitory computer readable storage medium having recorded thereon a computer program for interfacing with a display device, the computer program comprising:

code for displaying at least two visual objects on a display device;

code for detecting a single position of a first input contacting the display device, code for selecting a first displayed visual object based on the single position of the first input;

code for detecting a single position of a second input contacting the display device;

code for defining a first portion and a second portion of the first displayed visual object;

code for identifying a change in the single position of the second input;

code for controlling a change in a display characteristic of the first portion relative to the second portion of the first displayed visual object in accordance with the identified change in the single position of the second input;

detecting a movement of a second displayed visual object on the display device; and detecting a relative z-order of the first displayed visual object and the second displayed visual object in accordance with the detected movement of the second displayed visual object relative to the changed display characteristic of the first portion of the first displayed visual object.

21. A method of interfacing with a display device to change a z-order of a plurality of visual objects displayed on the display device, said method comprising steps of:

detecting a single position of a first input contacting the display device, selecting a first displayed visual object based on the single position of the first input;

detecting a single position of a second input contacting the display device;

determining a separation line based on the single position of the second input, said separation line separating the selected first displayed visual object into a first portion and a second portion; and controlling the z-order of the selected first displayed visual object relative to a second displayed visual object that is moved toward the selected first displayed visual object based on a movement of the second displayed visual object relative to the separation line.

* * * * *